(12) United States Patent
Miller et al.

(10) Patent No.: US 8,258,939 B2
(45) Date of Patent: *Sep. 4, 2012

(54) SYSTEM AND METHOD FOR CONTROLLING ONE OR MORE VEHICLE FEATURES BASED ON DRIVER STATUS

(75) Inventors: Thomas Lee Miller, Ann Arbor, MI (US); Brian Bennie, Sterling Heights, MI (US); Andrew D. Sarkisian, Commerce Township, MI (US); Matthew J. Dalebout, Canton, MI (US); Lawrence Daniel Cepuran, Northville, MI (US); Anthony Dwayne Cooprider, Rochester Hills, MI (US); Ronald Patrick Brombach, Plymouth, MI (US); Kevin Thomas Hille, Plymouth, MI (US); Karl William Wojcik, Sterling Heights, MI (US); John Robert Van Wiemeersch, Novi, MI (US); Terry Thomas Cwik, Northville, MI (US); Scott Alan Watkins, Sterling Heights, MI (US); Shimul Bhuva, Ann Arbor, MI (US); Aaron Lewis Mills, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/966,520

(22) Filed: Dec. 13, 2010

(65) Prior Publication Data

US 2011/0082625 A1    Apr. 7, 2011

Related U.S. Application Data

(63) Continuation-in-part of application No. 12/026,852, filed on Feb. 6, 2008, now Pat. No. 7,868,750.

(51) Int. Cl.
*B60Q 1/00* (2006.01)
(52) U.S. Cl. .......... 340/457.1; 340/572.1; 340/301
(58) Field of Classification Search .......... 340/457.1, 340/572.1, 676, 454, 459, 472, 571, 667, 340/301; 701/45, 301, 36
See application file for complete search history.

(56) References Cited

U.S. PATENT DOCUMENTS 3,878,915 A    4/1975    Purland et al.
(Continued)

FOREIGN PATENT DOCUMENTS

DE    3220083 A1    12/1983
(Continued)

OTHER PUBLICATIONS

ZR-1 Introduction; http://www.zr1netregistry.com/ZR1_about.htm, dated Sep. 25, 2006, 4 pages.
(Continued)

*Primary Examiner* — Daniel Previl
(74) *Attorney, Agent, or Firm* — Brooks Kushman P.C.; Jennifer M. Stec

(57) ABSTRACT

In at least one embodiment, a device for controlling one or more vehicle features for a primary driver and a secondary driver is provided. The device comprises at least one controller that is configured to receive at least one driver status signal indicative of the driver being one of the primary driver and the secondary driver and to determine whether the driver of the vehicle is the one of the primary driver and the secondary driver based on the at least one driver status signal. The controller is further configured to control one or more vehicle features and to prevent the one or more vehicle features from being disabled in response to determining that the at least one driver status signal indicates that the driver of the vehicle is the secondary driver.

26 Claims, 10 Drawing Sheets

U.S. PATENT DOCUMENTS

| | | | |
|---|---|---|---|
| 4,707,788 A | 11/1987 | Tashiro et al. | |
| 5,513,105 A | 4/1996 | Krones | |
| 5,552,789 A | 9/1996 | Schuermann | |
| 5,635,916 A | 6/1997 | Bucholtz et al. | |
| 5,769,051 A | 6/1998 | Bayron et al. | |
| 5,803,043 A | 9/1998 | Bayron et al. | |
| 5,829,782 A | 11/1998 | Breed et al. | |
| 6,188,326 B1 | 2/2001 | Flick | |
| 6,240,773 B1 * | 6/2001 | Rita et al. | 73/114.01 |
| 6,271,745 B1 | 8/2001 | Anzai et al. | |
| 6,278,358 B1 * | 8/2001 | Spoto et al. | 340/425.5 |
| 6,362,734 B1 | 3/2002 | McQuade et al. | |
| 6,386,007 B1 | 5/2002 | Johnson et al. | |
| 6,430,488 B1 * | 8/2002 | Goldman et al. | 701/36 |
| 6,501,374 B1 | 12/2002 | King et al. | |
| 6,573,615 B1 | 6/2003 | Asakura et al. | |
| 6,628,196 B1 | 9/2003 | Flick | |
| 6,659,360 B1 | 12/2003 | Schaefer et al. | |
| 6,675,082 B2 | 1/2004 | Galli et al. | |
| 6,748,536 B1 | 6/2004 | Madau | |
| 6,772,061 B1 | 8/2004 | Berthiaume et al. | |
| 6,785,595 B2 | 8/2004 | Kominami et al. | |
| 6,806,810 B2 | 10/2004 | Robinson | |
| 6,870,459 B1 | 3/2005 | Fest et al. | |
| 6,897,767 B2 | 5/2005 | Kim | |
| 6,909,947 B2 | 6/2005 | Douros et al. | |
| 6,952,156 B2 | 10/2005 | Arshad et al. | |
| 6,970,075 B2 | 11/2005 | Cherouny et al. | |
| 6,998,956 B2 | 2/2006 | Dix | |
| 7,006,914 B1 | 2/2006 | Cahoon | |
| 7,075,409 B2 * | 7/2006 | Guba | 340/5.21 |
| 7,117,075 B1 | 10/2006 | Larschan et al. | |
| 7,124,027 B1 | 10/2006 | Ernst, Jr. et al. | |
| 7,227,283 B2 | 6/2007 | Suzuki | |
| 7,271,712 B2 | 9/2007 | Rubel | |
| 7,363,139 B2 | 4/2008 | Glora et al. | |
| 7,388,475 B2 | 6/2008 | Litkouhi | |
| 7,424,357 B2 | 9/2008 | Ozaki et al. | |
| 7,626,494 B2 | 12/2009 | Yamamoto et al. | |
| 7,740,099 B2 | 6/2010 | Field et al. | |
| 7,757,803 B2 | 7/2010 | Fiske et al. | |
| 7,868,750 B2 * | 1/2011 | Miller et al. | 340/457.1 |
| 7,959,177 B2 | 6/2011 | Fiske et al. | |
| 2002/0170762 A1 | 11/2002 | Daneshmand | |
| 2004/0139034 A1 * | 7/2004 | Farmer | 705/400 |
| 2004/0263316 A1 | 12/2004 | Dix et al. | |
| 2005/0096829 A1 | 5/2005 | Sugano et al. | |
| 2006/0114101 A1 | 6/2006 | Schambeck et al. | |
| 2006/0155439 A1 | 7/2006 | Slawinski et al. | |
| 2006/0229784 A1 | 10/2006 | Bachmann et al. | |
| 2007/0088488 A1 | 4/2007 | Reeves et al. | |
| 2007/0126604 A1 | 6/2007 | Thacher | |
| 2008/0223645 A1 * | 9/2008 | Shaw | 180/270 |
| 2008/0294690 A1 * | 11/2008 | McClellan et al. | 707/104.1 |
| 2009/0195376 A1 | 8/2009 | Miller et al. | |
| 2009/0198410 A1 | 8/2009 | Miller et al. | |
| 2009/0198413 A1 | 8/2009 | Miller et al. | |
| 2009/0198445 A1 | 8/2009 | Miller et al. | |
| 2009/0312901 A1 | 12/2009 | Miller et al. | |
| 2009/0312902 A1 | 12/2009 | Miller et al. | |
| 2012/0065862 A1 | 3/2012 | Fiske et al. | |

FOREIGN PATENT DOCUMENTS

| | | |
|---|---|---|
| DE | 19961619 A1 | 6/2001 |
| DE | 10064141 A1 | 7/2002 |
| DE | 102005007865 A1 | 9/2006 |
| EP | 0974428 A2 | 1/2000 |
| EP | 1101670 | 5/2001 |
| EP | 1191486 A1 | 3/2002 |
| EP | 1728945 A1 | 12/2006 |
| GB | 2273580 A | 6/1994 |
| JP | 1047630 A | 2/1989 |
| JP | 2005254975 A | 9/2005 |
| JP | 2006129223 A | 5/2006 |
| WO | 0125572 A1 | 4/2001 |
| WO | 2007133994 A2 | 11/2007 |

OTHER PUBLICATIONS

Road Safety RS-1000 Automotive On-Board Computer for Teen Drivers; http://www.techedu.com/RoadSafety_RS-1000.asp, dated Sep. 27, 2006, 5 pages.

German Office Action for corresponding German Application No. 10 2009 003 431.5, mailed Apr. 20, 2009, 5 pages.

"Driving—Forward (If Equipped) and Reverse Sensing Systems," pp. 244-245, Jun. 2002.

U.S. Office Action for U.S. Appl. No. 12/139,070, mailed Apr. 4, 2011, 13 pages.

Patty Mattern, "Getting smarter at getting safer", University of Minnesota, UMNnews, Sep. 13, 2005, 2 pages.

"Rider Customization Settings", 2007, Segway Inc., 2 pages.

Volvo Car Corporation, "Sustainability Report", 2005, 20 pages.

www.youtube.com, Auto Makers Offer Safety Systems for High-Risk Teen, May 4, 2007, 1 page.

www.gizmag.com/go/4448, "Volvo experimenting with new safety features", Aug. 17, 2005, 4 pages.

www.autos.ca/forum/index.php?topic=39661.0, "Volvo-Key to Safety At Start Up", Aug. 27, 2005, 6 pages.

www.carpages.co.uk/volvo/volvo-safety-concepts-02-09=05.asp, "Volvo's Latest Safety Concepts Aim To Help Road Safety", Sep. 2, 2005, 3 pages.

strangenewproducts.com/2005/08/volvos-multi-lock-system-prevents.html, "Volvo's Multi-lock System Prevents Drunk Driving", Aug. 22, 2005, 5 pages.

www.conceptcaronline.com/news/technology/cardesignnews26.php, "Volvo's Seat-Belt Breathalyser", Aug. 19, 2005, 2 pages.

English translation of DE 199 61 619 A1, Jun. 28, 2001, 5 pages.

* cited by examiner

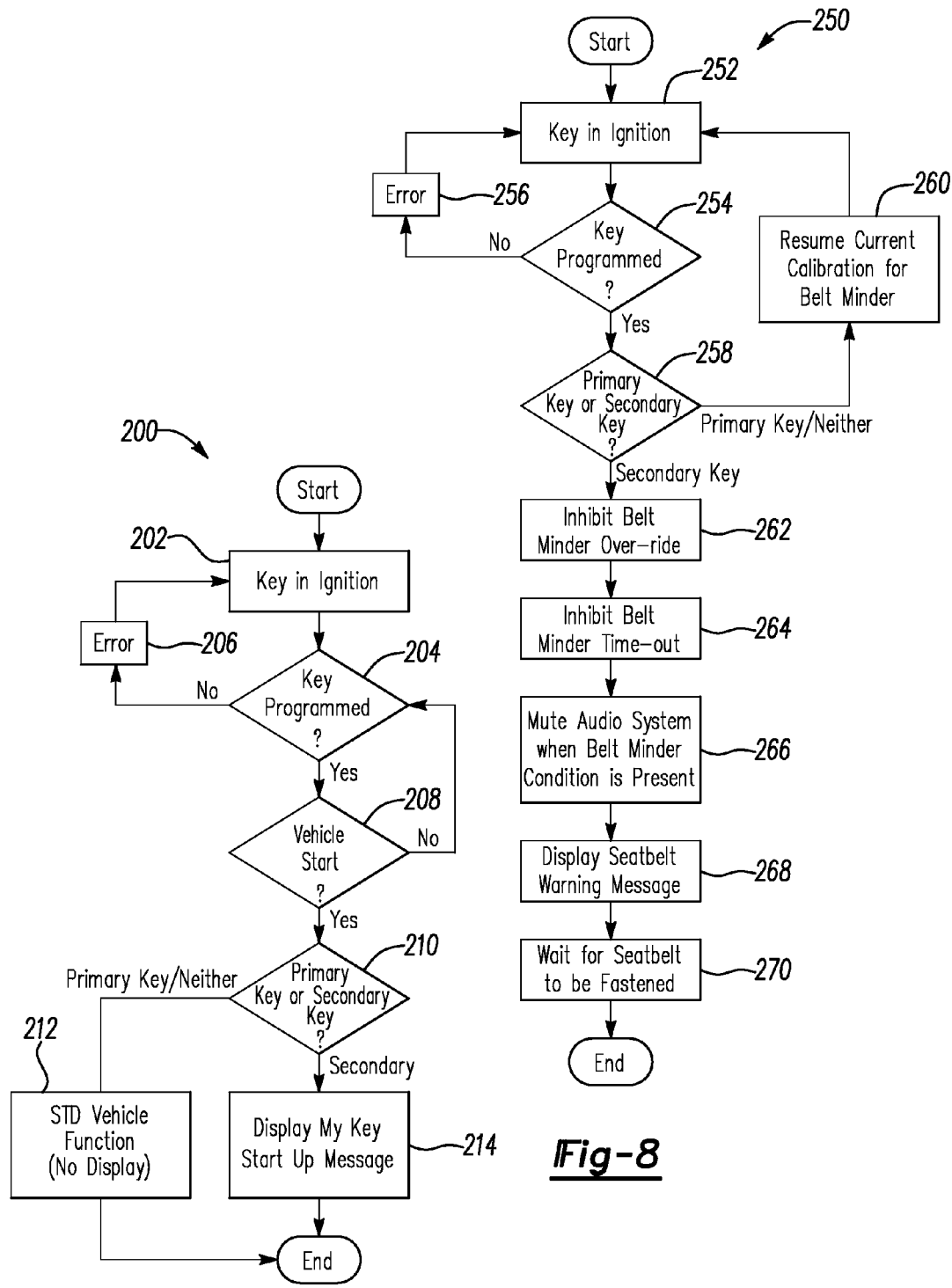

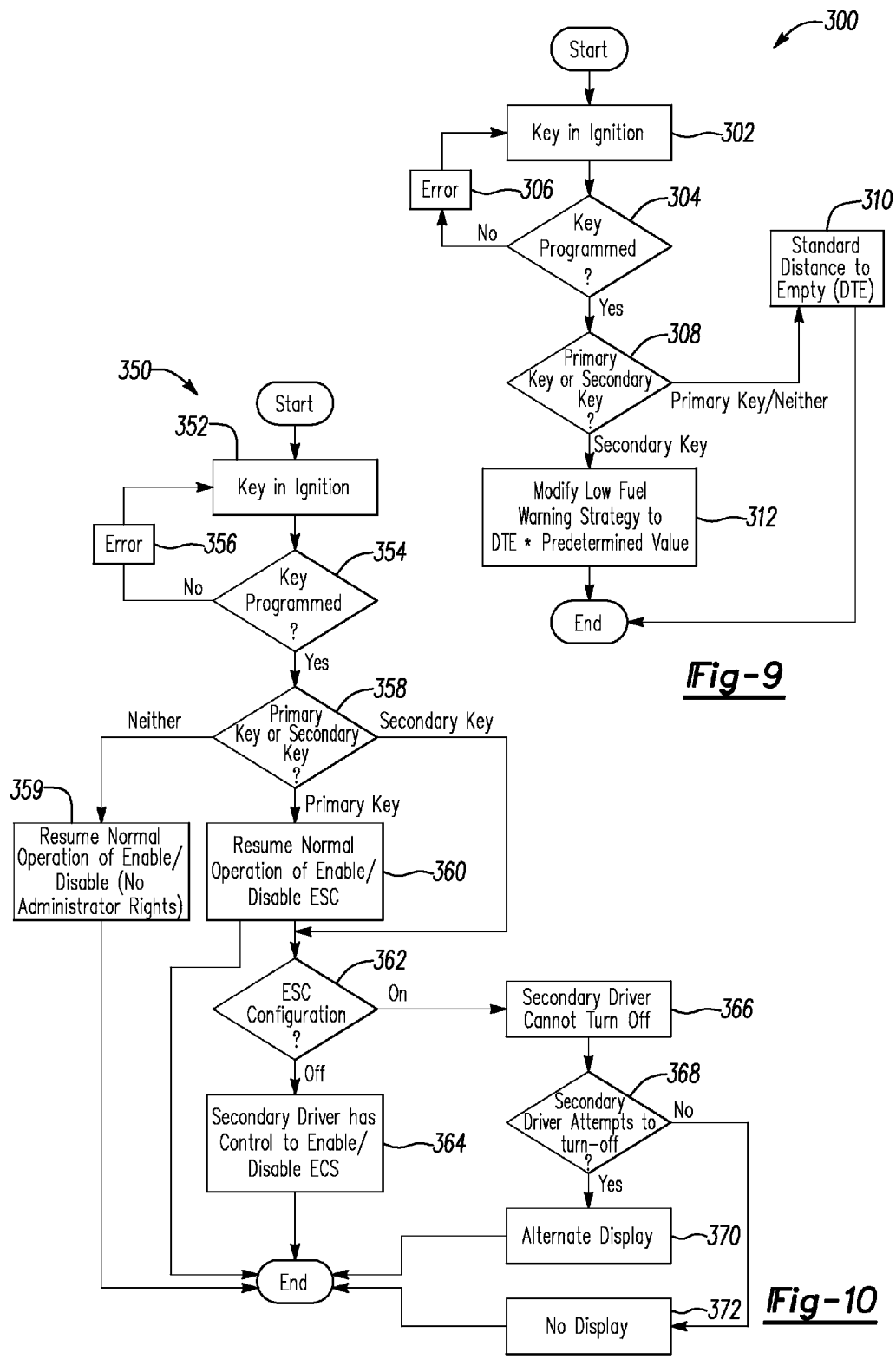

SYSTEM AND METHOD FOR CONTROLLING ONE OR MORE VEHICLE FEATURES BASED ON DRIVER STATUS

CROSS-REFERENCE TO RELATED APPLICATIONS

This application is a continuation-in-part of U.S. application Ser. No. 12/026,852 filed on Feb. 6, 2008, now U.S. Pat. No. 7,868,750; which is hereby incorporated by reference in its entirety.

TECHNICAL FIELD

The embodiments described herein generally relate to a system and method for controlling the operation of one or more vehicle features between primary and secondary drivers.

BACKGROUND

With conventional automotive vehicles, one or more keys are often shared between any number of drivers. For example, the parents of a teenager (or young adult) that is old enough to drive may share the keys for the vehicle with the teenager. The vehicle may be equipped with various safety and/or driver notification features that may be enabled/disabled via a user interface based on the driver's needs. However, in some circumstances, the parent may not wish to have the various safety and notification related features disabled by the teenager. The parent may enable the safety and notification features prior to allowing the teenager to drive the vehicle, however there is no guarantee that the teenager may keep the safety and notification features enabled while driving the vehicle. Conventional vehicles fail to give parents, or other such primary drivers, the option of preventing teenagers eligible to drive or other such secondary drivers from disabling safety and notification features.

SUMMARY

In at least one embodiment, a device for controlling one or more vehicle features for a primary driver and a secondary driver is provided. The device comprises at least one controller that is configured to receive at least one driver status signal indicative of the driver being one of the primary driver and the secondary driver and to determine whether the driver of the vehicle is the one of the primary driver and the secondary driver based on the at least one driver status signal. The at least one controller is further configured to control one or more vehicle features and to prevent the one or more vehicle features from being disabled in response to determining that the at least one driver status signal indicates that the driver of the vehicle is the secondary driver.

BRIEF DESCRIPTION OF THE DRAWINGS

FIG. 7 depicts a block diagram for displaying a message for notifying drivers when the vehicle is in a driver identification mode;

FIG. 8 depicts a block diagram for inhibiting a seatbelt restraint status based on the status of the driver;

FIG. 9 depicts a block diagram for providing a fuel level warning based on the status of the driver;

FIG. 10 depicts a block diagram for inhibiting traction control disable/electronic stability control based on the status of the driver;

DETAILED DESCRIPTION

Figure 1:
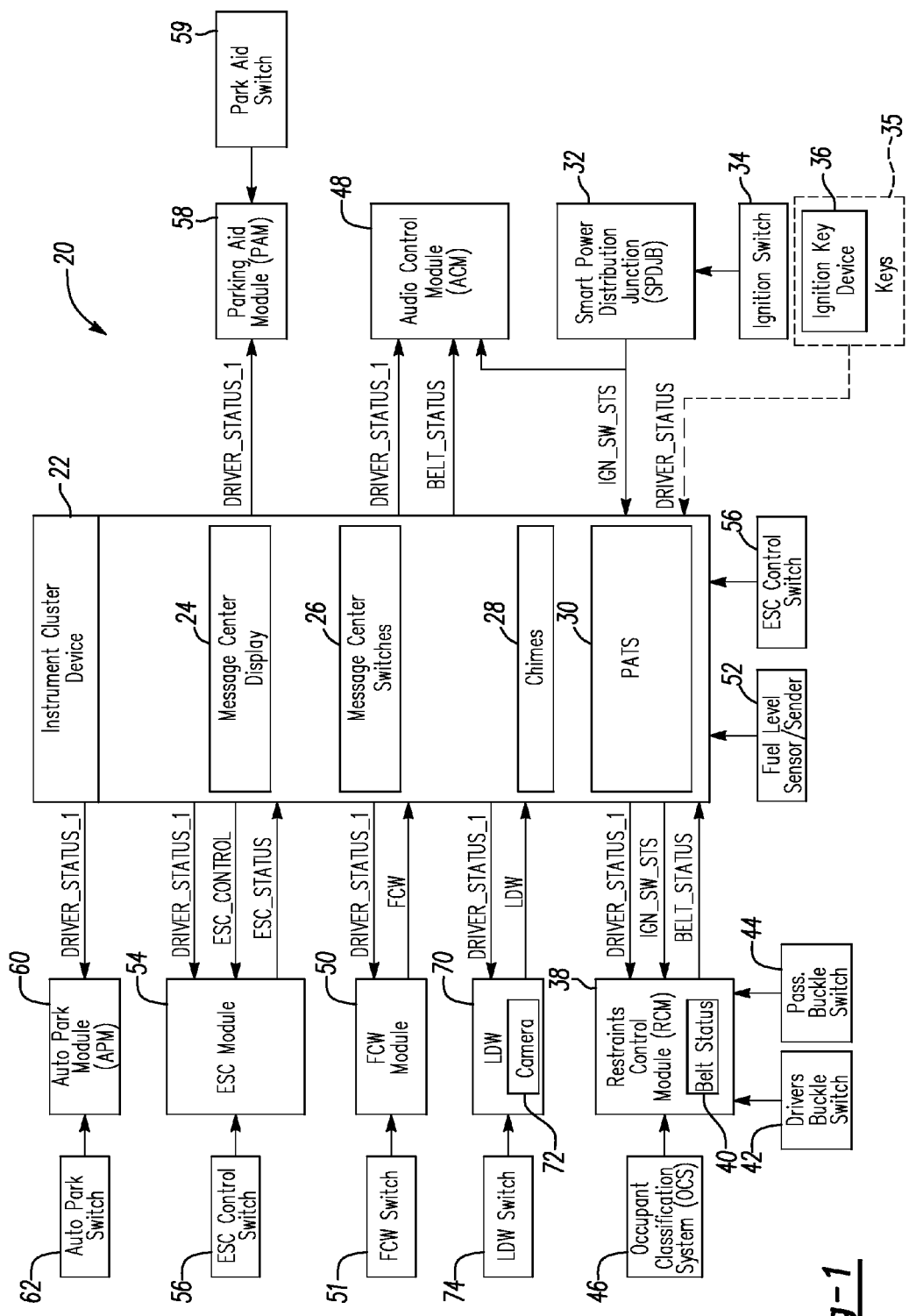
FIG. 1 depicts a system for differentiating between primary and secondary drivers of a vehicle and for controlling the operation of various safety and notification features based on the status of the driver in accordance to one embodiment of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present invention generally provides for a driver identification functional operation whereby primary and secondary drivers are determined and various levels of control are granted to the driver based on whether the driver is the primary driver or the secondary driver. In general, the primary driver may be defined as the administrative driver who has greater control over the functionality of one or more vehicle features. Such vehicle features may relate to, but not limited to, safety and/or notification features in the vehicle. Examples of primary drivers may include, but not limited to, a parent, an employer (or agent of the employer who has management authority over employees who use vehicles provided by the employer for purposes of performing a particular function/job), agent of a rental car agency, owner of a vehicle that uses a valet service. The secondary driver may be defined as a restricted driver who has limited control over the various vehicle features and is to abide by the functional restrictions imposed or selected by the vehicle or the primary driver (i.e., the vehicle features are not to be disabled by the secondary driver). Examples of secondary drivers may include, but not limited to, a novice driver (e.g., a teenager), an employee (i.e., person under the control of an employer or agent of the employer), consumers who purchase rental car services, or a valet. The embodiments of the present invention provide, but not limited to, inhibiting a seatbelt restraint status disable, inhibiting a forward collision warning (FCW) disable, inhibiting an electronic stability control (ESC) disable, inhibiting a traction control (TC) disable, inhibiting a lane departure warning (LDW) disable, and adjusting the operation of a low fluid level warning or low fuel level warning. The inhibiting and adjusting operations may be based on the status of the driver.

The embodiments of the present invention as set forth herein generally illustrate and describe a plurality of controllers (or modules), or other such electrically based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired or intended to be implemented in the vehicle. The controllers may be combined with each other and/or separated in any manner based on the particular type of electrical architecture that is desired in the vehicle. It is generally recognized that each controller and/or module/device disclosed herein may include, but not limited to, any number of microprocessors, ICs, memory devices (e.g., FLASH, RAM, ROM, EPROM, EEPROM, or other suitable variants thereof), and software which co-act with one another to perform the various functions set forth below.

FIG. 1 depicts a system 20 for differentiating between the primary and secondary drivers of the vehicle and for controlling the operation of various safety and notification features based on the status of the driver. The system 20 generally comprises an instrument cluster controller 22. The instrument cluster controller 22 (or cluster) includes a message center display 24. The message center display 24 displays various information such as the various states of vehicle functionality to the driver. For example, the message center display 24 may display and not limited to a driver identification message during vehicle startup, various administrative menu options, a seatbelt warning message, a speed limit start up message, vehicle near top speed message, top speed message, driver identification speed warnings, and/or an inhibit ESC, FCW, LDW message or other safety or notification related message.

The cluster 22 also includes a plurality of message center switches 26 and chimes 28. The driver may toggle the message center switches 26 to view different messages and/or respond to various prompts directed to the driver by the vehicle. The chimes 28 may audibly notify the driver when predetermined vehicle conditions have been met. In one example, the cluster 22 may activate the chimes 28 when the vehicle is near a top speed, the vehicle has achieved a top speed, the vehicle has exceeded the top speed, there is a low level of fuel in the fuel tank, and/or when the TC is enabled. It is recognized that the display 24, switches 26, and/or chimes 28 may be packaged in any number of locations in the vehicle other than the cluster 22.

The cluster 22 may include a passive anti-theft security (PATS) controller 30. While FIG. 1 generally illustrates that the PATS controller 30 is positioned within the cluster 22, other implementations may include the PATS controller 30 being implemented as a standalone controller and positioned external to the cluster 22. A smart power distribution junction box (SPDJB) controller 32 may be operably coupled to the cluster 22. The cluster 22 and the SPDJB controller 32 may communicate with each via a communication bus. In general, all of the signals transmitted to/from the cluster 22 may be transmitted via the communication bus. The communication bus may be implemented as a High/Medium Speed Controller Area Network (CAN) bus or a Local Interconnect Network (LIN). The particular type of communication bus used may be varied to meet the desired criteria of a particular implementation. The SPDJB controller 32 may include a plurality of fuses, relays, and various micro-controllers for performing any number of functions related to the operation of interior and/or exterior electrically based functionality of the vehicle. Such functions may include but are not limited to electronic unlocking/locking (via interior door lock/unlock switches), remote keyless entry operation, vehicle lighting (interior and/or exterior), electronic power windows, and/or key ignition status (e.g., Off, Run, Start, Accessory (ACCY)).

An ignition switch 34 may be operably coupled to the SPDJB controller 32. The SPDJB controller 32 may receive hardwired signals indicative of the position of the ignition switch 34 and transmit messages on the communication bus that are indicative of the position of the ignition switch. For example, the SPDJB controller 32 may transmit a signal IGN_SW_STS over the communication bus to the cluster 22. The SPDJB controller 32 may transmit the signal IGN_SW_STS to any controller coupled to the communication bus that may need key ignition status as an input to perform a particular function.

The ignition switch 34 may receive one or more keys 35 to start the vehicle. The keys 35 may be tagged or associated with the primary driver and the secondary driver of the vehicle. The key 35 includes an ignition key device 36 embedded therein for communicating with the vehicle. The ignition key device 36 comprises a transponder (not shown) having an integrated circuit and an antenna. The transponder is adapted to transmit an electronic code as a signal DRIVER_STATUS to the PATS controller 30. The signal DRIVER_STATUS may be indicative of which driver (e.g., primary or secondary) is driving the vehicle. The signal DRIVER_STATUS may be in the form of radio frequency (RF) based signal or a radio frequency identification (RFID) tag which corresponds to hexadecimal-based data. The PATS controller 30 determines if the hex data in the RFID tag matches predetermined hex data stored therein (e.g., in a look up table of the PATS controller 30) prior to allowing the vehicle to start for anti-theft purposes. In the event the RFID tag matches the predetermined hex data, an engine controller operably coupled to the PATS controller 30 allows the vehicle to start the engine. In general, the vehicle assembly plant, supplier facility (e.g., manufacturer of the keys and/or PATS controller 30), or car dealership performs the operation of learning the RFID tag of the keys 35 to the vehicle prior to delivery the vehicle to the end user.

The PATS controller 30 may also use the signal DRIVER_STATUS for purposes of identifying whether the driver of the vehicle is the primary driver or the secondary driver. For example, the PATS controller 30 may transmit a signal DRIVER_STATUS_1 to indicate whether the particular driver is the primary driver or the secondary driver to various vehicle controllers or modules as either message data on the communication bus or hardwired signals. Prior to the PATS controller 30 transmitting the signal DRIVER_STATUS_1, the primary and secondary keys must be learned to the PATS controller 30.

The system 20 may employ different operations for associating the keys 35 to the primary and secondary drivers. In one implementation, the PATS controller 30 may employ a sequential based operation for associating the keys 35 to the primary and secondary drivers. For example, during the learn operation whereby the RFID tag for a particular key is learned to the vehicle to support the passive anti-theft function, the PATS controller 30 may assign priority status to the first key learned which in essence tags the first key as the primary key. The RFID tag of the first key learned to the vehicle may be assigned a higher status than the second key. The RFID tag of the second key when learned to the vehicle may be designated by the PATS controller 30 as the secondary key. The particular order with respect to when a key is assigned primary or secondary status may be varied to meet the designed criteria of a particular implementation. In addition, any number of spare keys may be tagged as being either primary or secondary. For example, any number of replacement or spare keys may be learned to the vehicle and designated as either a primary or a secondary key. After the PATS controller 30 tags the keys 35 as either primary or secondary keys, the PATS controller 30 sends the signal DRIVER_STATUS_1 over the bus to indicate whether the driver of the vehicle is the primary or secondary driver. The tag operation may be performed simultaneously with the process of learning the keys 35 to the PATS controller 30 for passive anti-theft purposes.

In another implementation, the PATS controller 30 may add additional data to the RFID tag to correspond to whether the driver of the vehicle is the primary or the secondary driver. The RFID tag may include a byte which includes predetermined hex values that corresponds to whether the driver of the vehicle is the primary or secondary driver. For example, the byte may include the value "FE" which corresponds to the primary driver. The PATS controller 30 upon receiving the RFID tag with the "FE" value may recognize the particular key as a primary key and determine that the status of the driver is the primary driver. The byte may also include the value "FF" in the place of "FE" which corresponds to the secondary driver. The PATS controller 30 upon receiving the RFID tag with the value "FF" may recognize the particular key as a secondary key and determine that the status of the driver is the secondary driver. It should be noted that the hex bytes "FE" and "FF" are used for illustrative purposes. The particular type of hex data and the length of data used to correspond to the primary and secondary drivers may vary based on the desired criteria of a particular implementation.

A restraint control module (RCM) 38 may be operably coupled to the cluster 22 via the communication bus. The RCM 38 may deploy various safety restraint systems in response to the vehicle experiencing impact with an object. For example, the restraint control module 38 may deploy one or more airbags positioned about the vehicle, motorized pretensioners, and/or seat controls to reduce the risk of injury to vehicle occupants in the event the vehicle experiences an impact. A seatbelt status controller 40 may be operably coupled to the restraints control module 38. While FIG. 1 generally illustrates that the seatbelt status controller 40 is positioned within the RCM 38, additional configurations may include positioning the seatbelt status controller 40 out of the RCM 38. The seatbelt status controller 40 is generally adapted to notify the driver that one or more seatbelts in the vehicle have not been fastened or are in an unbuckled state. The seatbelt status operation controller is disclosed in U.S. Pat. Nos. 6,278,358 to Spoto et al.; 6,362,734 to McQuade et al.; and 6,501,374 to King et al. which are assigned to the assignee of the present invention and are hereby incorporated by reference in their entirety.

A driver's buckle switch 42 is coupled to the seatbelt status controller 40 and generally presents data indicative of whether the driver's seatbelt is fastened to the driver. A passenger buckle switch 44 is also coupled to the seatbelt status controller 40 and generally presents data indicative of whether the passenger's seatbelt is fastened. An occupant classification system 46 may be optionally coupled to the seatbelt status controller 40 for providing information with respect to the position of the occupants in the vehicle. The seatbelt status controller 40 may use such information provided by the occupant classification system 46 to determine which seat is occupied by an occupant. Based on vehicle occupant location, the seatbelt status controller 40 may have knowledge with respect to which seatbelts may need to be monitored by the seatbelt status controller 40.

In general, the seatbelt status controller 40 is generally adapted to audibly and visually notify the occupant in the vehicle that one or more of the seatbelts are not fastened when the ignition is in the run position and the vehicle speed is above a predetermined speed threshold. In addition, the seatbelt status controller 40 may be deactivated if at any time the seatbelt is fastened (or buckled), or after the seatbelt status controller 40 has audibly and visually notified the occupant for a predetermined amount of time (e.g., five minutes). The seatbelt status controller 40 includes a chime (not shown) for audibly notifying the driver in the event one or more of the seatbelts are not fastened, the vehicle speed has reached and/or exceeded the predetermined vehicle speed threshold, and the position of the ignition switch 34 is in run. The seatbelt status controller 40 may transmit a signal BLT_STS over the communication bus to the cluster 22 so that the cluster 22 visually notifies the driver via the message center display 24 or with a telltale indicator that one or more of the seatbelts are not fastened (or buckled). The telltale is generally defined as a indicator positioned in the cluster 22 which includes a symbol (e.g., engine, seatbelt, low fuel, charge status of battery, etc.) positioned thereon and configured to illuminate when predetermined conditions related to each of the engine, seatbelt, low fuel, and low battery charge have been met. The signal BLT_STS generally corresponds to a restraint status signal in which one or more of the seatbelts may be unfastened or in an unbuckled state and the vehicle speed and the ignition status conditions have been met. In one example, the seatbelt status controller 40 may transmit an intermittent chime at 240 rep/min at a frequency of 740 Hz. The number or repetitions per minute and the frequency of the chime may vary based on the desired characteristics of a particular implementation.

The cluster 22 transmits the signal IGN_SW_STS to the seatbelt status controller 40 so that the seatbelt status controller 40 may assess the status of the ignition switch 34 (e.g., OFF, RUN, ACCY or START). An audio control module (ACM) 48 may be operably coupled to the cluster 22 via the communication bus. The ACM 48 is adapted to generate audible signals for entertainment purposes. The ACM 48 may also be adapted to amplify voice commands in the event a cell phone is coupled to the ACM 48. In addition, the ACM 48 may be used in combination with a voice recognition session. The ACM 48 ceases to generate audible signals in response to the seatbelt status controller 40 determining that one or more seatbelts are not fastened, and the vehicle speed and ignition status conditions are met. The ACM 48 performs the mute operation in response to receiving the signal BLT_STATUS. The ACM 48 may not be in a muted state when used to facilitate a cell phone conversation or when used in connection with a voice recognition session in the event the seatbelts are disabled and the applicable vehicle criteria is met.

Conventional vehicles generally provide drivers with the ability to enable or disable the seatbelt status controller 40 in order to turn off/on the controller 40 as desired by the driver. By disabling the controller 40, the controller 40 may cease to audibly notify the driver and cease to transmit the signal BLT_STATUS to the cluster 22 for visually notifying the driver that the seatbelts are in unbuckled state. The system 20 provides the primary driver with the option of selectively enabling/disabling the operation of the controller 40, however, the system 20 may prevent the secondary driver from disabling the operation of the seatbelt status controller 40. The controller 40 receives the signal DRIVER_STATUS_1 to determine whether the driver is the primary driver or the secondary driver. The seatbelt status controller 40 is generally configured "ON" and provides audible notification and the cluster 22 is configured to visually present the safety belt unfastened message when the applicable vehicle criteria is met and in response to determining that the secondary driver is driving the vehicle. The functionality performed by the seatbelt status controller 40 may be incorporated into the cluster 22 or the SPDJB 32.

In one example, the cluster 22 may visually present the option of enabling/disabling the seatbelt status option via the message center display 24 and allow the primary driver to select a corresponding option via the message center switches 26. In such an example, the cluster 22 may transmit a control signal (not shown) to the seatbelt status controller 40 to enable/disable the seatbelt status operation. The cluster 22 on the other hand may not visually present such an option to the secondary driver in response to detecting that the driver of the vehicle is the secondary driver. The control of the operation of the seatbelt status controller 40 based on the status of the driver will be further discussed in connection with FIG. 8. In the event the driver of the vehicle is the secondary driver, the ACM 48 is muted in response to determining that the secondary driver is not fastened with a seatbelt and the applicable vehicle criteria is met. The muted characteristic of the ACM 48 may not be enabled/disabled by the secondary driver.

A forward collision warning (FCW) module 50 may be operably coupled to the cluster 22 and receive the signal DRIVER_STATUS_1 from the cluster 22. The FCW module 50 may be a portion of an active sensing system that is adapted to determine if the vehicle is in a state in which a frontal collision may be imminent. In such a case, the FCW module 50 may transmit a signal FCW to the cluster 22 in the event a forward collision is imminent. The FCW system generally includes a heads up display (HUD) which includes a bank of LEDs. The bank of LEDs are disposed about the windshield of the vehicle. The FCW module 50 is operably coupled to a radar system (not shown). The radar system detects the position of the object with respect to the vehicle. In the event an imminent collision is detected by the radar system, the radar system transmits a control signal (not shown) to the FCW module 50. The FCW module 50 illuminates the bank of LEDs to notify the occupants that a collision may be imminent. The FCW module 50 generally allows the driver to enable/disable the chime and/or the visual indicators as well as to adjust a particular sensitivity level.

The cluster 22 may also audibly and visually notify (via the message center display 24 (or telltale) and the chimes 28) the driver of the collision when the collision is imminent. An FCW switch 51 may be coupled to the FCW module 50 to enable/disable the FCW module 50 and control vehicle sensitivity. In addition the FCW feature may be enabled/disabled by the primary driver via the message center switches 26 in the cluster 22. In such an example, the cluster 22 may transmit a control signal (not shown) to the FCW module 50 to enable/disable the FCW feature. The primary driver is generally permitted to enable/disable the chime and/or visual indicator and adjust the sensitivity level of the FCW system. The secondary driver is prohibited from disabling the FCW feature in the event the secondary driver is detected to be the driver of the vehicle. For example, the cluster 22 may not present the enable/disable prompt to the secondary driver via the cluster 22 to allow the secondary driver to disable FCW. The cluster 22 is configured to allow the secondary driver to adjust vehicle sensitivity for determining the particular moment in which the FCW warning is to be issued. The secondary driver may increase/decrease sensitivity to trigger the FCW earlier/later based on the selected sensitivity level. The secondary driver is prohibited from enabling/disabling the visual and/or audible warning mechanism of the FCW. The control of the operation of the FCW warning will be discussed further in connection with FIG. 12.

A fuel level sensor 52 may be operably coupled to the cluster 22 for transmitting information with respect to the amount of fuel (or the fuel level) in the fuel tank of the vehicle. The cluster 22 may visually present a low fuel warning via the message center display 24 or with a telltale (not shown). It is recognized that the cluster 22 may also visually present a low battery charge warning via the message center display 24 or with the telltale. The cluster 22 is adapted to calculate the amount of fuel based on the fuel level information provided by the fuel level sensor 52. In one example, the cluster 22 is generally adapted to present the low fuel warning when the fuel level is less than or equal to a standard Distance-To-Empty (DTE). The DTE is defined as the distance in miles or kilometers from the moment to when the fuel tank may be empty. The DTE value may be varied based on who the particular driver (e.g., primary or secondary) of the vehicle is. In one example, the standard DTE for the primary driver may be in a range of between one to sixty miles from the moment in which the fuel tank may be empty.

The strategy for triggering the low fuel warning may be altered in the event the cluster 22 determines that the vehicle is being driven by the secondary driver. For example, the low fuel warning may be issued when the fuel level is less than or equal to the standard DTE multiplied by a predetermined value. In one example, the predetermined value may be set to one and a half while the DTE is at fifty miles. In such a case, the cluster 22 may issue the low fuel warning earlier (e.g., at seventy five miles before the fuel tank is empty) when compared to the point in which the low fuel warning is issued for the primary driver. In general, the system 10 is adapted to provide for the low fuel warning at an earlier point in time when the driver of the vehicle is detected to be the secondary driver. The control of the operation of the low fuel level warning will be discussed further in connection with FIG. 9. It should be noted that the low fuel level strategy may be implemented for any type of low fluid warning detection configuration in the vehicle. Such a low fluid warning detection configuration may apply to windshield wiper fluid, oil and/or transmission fluid. It is also recognized that that the system 10 may be provide for a low battery charge warning at an earlier point in time when the driver of the vehicle is detected to be the secondary driver. In one example, the system 10 may generate a low battery charge when at least one battery is detected to have a charge of less then or equal to 35% (e.g., first threshold) for the secondary driver, as opposed to when the charge of the at least one battery is detected to have a charge of less then or equal to 25% (e.g., second threshold) for the primary driver. It is recognized that the charge values selected as thresholds for triggering the warnings for the primary driver and the secondary driver may vary based on the desired criteria of a particular application.

In reference to implementing the early low battery charge warning, any one or more of the systems disclosed herein may include at least one battery and a battery charge module. The battery charge module may be operably coupled to the at least one battery. The battery charge module may ascertain charge status of the at least one battery and communicate the same on the data communication bus to the cluster 22 or other device that is generally situated to warn the driver of the charge status. The cluster 22 or equivalent device may store various charge status values for the battery(s) as thresholds (e.g., see first and second threshold above) and generate a warning in the event the measured charged status is below the first threshold for the secondary driver or is below the second threshold for the primary driver.

An ESC module 54 may be operably coupled to the cluster 22. The ESC module 54 is adapted to control the operation of various electronic stability control (ESC) systems, such as traction control (TC), yaw stability control (YSC) and rollover stability control (RSC). The ESC module 54 may include a TC controller (not shown), a YSC controller (not shown) and a RSC controller (not shown). The TC controller generally reduces power to drive wheels of the vehicle in order to minimize wheel-spin and maximize traction. The YSC controller generally controls the vehicle's motion of rotation about a vertical axis. The RSC controller generally controls the motion of the vehicle by selectively applying brakes and controlling the speed of the vehicle to prevent the vehicle from rolling over.

An ESC control switch 56 may be operably coupled directly to the ESC module 54 or directly to the cluster 22. The ESC control switch 56 generally allows the driver the ability to enable/disable the one or more ESC operations in the event one or more of the ESC operations are not needed. For example, the ESC control switch 56 may allow the driver the ability to disable the traction control system due to various road conditions, such as snow, dirt, ice, etc. The ESC module 54 is configured to present a signal ESC_STATUS to the cluster 22 so that the cluster 22 can display the current state of ESC systems (e.g., TC, YSC and RSC). In the event the ESC control switch 56 is coupled to the cluster 22, the cluster 22 transmits a signal ESC_CONTROL to the ESC module 54 to enable/disable the ESC operations. The message center switch 26 may also be used by the driver to enable/disable the ESC operation without the need for the ESC switch 56. In such a case, the cluster 22 transmits the signal ESC_CONTROL to the ESC module 54 to enable/disable the ESC operation.

The ESC module 54 is adapted to receive the signal DRIVER_STATUS from the cluster 22 to determine if the driver of the vehicle is the primary or the secondary driver. The ESC module 54 is configured to prevent the secondary driver from disabling any one or more of the ESC operations. For example, the primary driver may desire to prevent the secondary driver from disabling the traction control operation for safety reasons. Such a condition may prevent the secondary driver from spinning or burning the tires and/or drifting when the traction control is disabled. In the event the driver of the vehicle is the secondary driver, the cluster 22 may not present a message in the message center display 24 to the secondary driver to allow the secondary driver to disable the ESC operations. In the event the secondary driver attempts to disable any one or more of the ESC features, the cluster 22 may display an ESC driver status message.

The primary driver may allow the secondary driver to enable/disable the operation of the traction control in the event it may be likely that the secondary driver may experience road conditions that may require disabling traction control. For example, due to various weather conditions or road conditions, the primary driver may configure the ESC module 54 via the cluster 22 to allow the secondary driver to disable the traction control. For example, the message center display 24 may provide for an inhibit traction control message which allows the primary driver the option of either allowing the secondary driver the ability to enable/disable traction control or to inhibit enabling/disabling the traction control.

In the event the primary driver intends to allow the secondary driver to enable/disable the traction control, the primary driver may simply choose not to select the inhibit traction control option with the message center switches 26. No action is required by the primary driver in this case. In the event the primary driver intends to inhibit the traction control disable feature for the secondary driver (e.g., prevent the secondary driver from either enabling/disabling the traction control feature), the primary driver may select the inhibit feature via the message control switches 26 thereby precluding the secondary driver from enabling/disabling the traction control feature. The cluster 22 may transmit the signal ESC_CONTROL to the ESC module 54 (e.g., if the ESC control switch 56 is coupled to the cluster 22) which is indicative of whether the secondary driver can enable/disable the one or more ESC operations or whether the secondary driver is precluded from enabling/disabling the traction feature. The control over the operation of the ESC operations will be discussed further in connection with FIG. 10.

A parking aid module 58 may be operably coupled to the cluster 22. The parking aid module 58 is adapted to provide a warning to the driver in the event the front or rear portions of the vehicle comes too close to an object while the vehicle is being parked. In one example, a park aid switch 59 may be coupled to the parking aid module 58 and enable/disable the park aid feature. In another example, the driver may use the message center switches 26 to enable/disable the park aid feature. In another implementation the parking aid module 58 may be integrated into an auto park module 60. The auto park module 60 may be coupled to cluster 22. The auto park module 60 is generally configured to automatically park the vehicle for the driver. For example, in a parallel parking situation, the driver may give control over the vehicle to the auto park module 60 and allow the vehicle to park itself. An auto park switch 62 is coupled to the auto park module 60 for controlling the operation of the auto park switch 62.

The operation of the park aid feature may be enabled/disabled based on the status of the driver. The primary driver is free to enable/disable the operation of the park aid feature as desired. The primary driver may prevent the secondary driver from disabling the park aid feature. The parking aid module 58 is adapted to receive the signal DRIVER_STATUS_1 from the cluster 22 to determine if the driver of the vehicle is the primary or the secondary driver. In the event the driver of the vehicle is determined to be the primary driver, the cluster 22 may allow the primary driver to enable/disable the park aid operation via the park aid switch 59. In one example, the primary driver may view the enable/disable park aid option via the message center display 24 and select the enable/disable option via the message center switches 26. In such an example, the cluster 22 may transmit a control signal (not shown) to the parking aid module 58 to enable/disable the park aid feature.

In the event the driver is the secondary driver, the cluster 22 inhibits the park aid disable option and prevents the secondary driver from viewing the enable/disable park aid option in the message center display 24. In the auto park module 60 implementation, the cluster 22 may be adapted to transmit the signal DRIVER_STATUS_1 to the auto park module 60 to determine whether the driver is the primary or the secondary driver. The control over the operation of the parking aid feature will be discussed further in connection with FIG. 11.

An LDW module 70 is operably coupled to the cluster 22. A forward pointing camera 72 is operably coupled to the LDW module 70. The LDW module 70 uses the forward pointing camera 72 to determine what side of the vehicle is deviating from a lane or crossing over the lane to issue a warning. The LDW module 70 transmits a signal LDW to the cluster 22 so that the device generates an audible and/or visual warning for the driver.

The LDW module 70 is configured to detect a shift in the driver's performance that may cause the vehicle to leave a lane or head off of the road. For example, the LDW module 70 may detect the vehicle's position with respect to road lane markings in order to detect a lane departure. The vehicle position is evaluated by measuring the lateral distance from generally the center of the camera 72 to the left and the right lane markings. Such a measurement is generally defined as a Driver's Impairment Monitor (DIMON) The LDW module 70 assigns a rating to DIMON. In general, the LDW module 70 monitors the DIMON to detect a shift in the driver's performance that may be attributed to the driver exhibiting a drowsy or sleepy condition. In the event the DIMON rating is high, the LDW module 70 may transmit the signal LDW to the cluster 22 so that the cluster 22 visually and/or audibly notifies the driver that the vehicle is veering off of the road at an early stage so that the driver can regain control of the vehicle prior to collision or other failure mode. Impairment may be inferred by detecting a change in variation (e.g., common cause variation vs. special cause variation).

The LDW feature may be adjusted to various sensitivity levels that are selected by the driver. The LDW operation may be sensitive (e.g., LDW module 70 generates warning early based on slight lane variation) or more tolerant (e.g., LDW module 70 generates warning based on greater lane variation). Such a condition is provided to account for different driving styles of the driver.

In one example, an LDW switch 74 may be coupled to the LDW module 70 and enable/disable the LDW feature. In another implementation, the driver may use the message center switches 26 to enable/disable the LDW feature. The operation of the LDW feature may be enabled/disabled based on the status of the driver. For example, the primary driver is free to enable/disable the operation of the LDW feature as desired (e.g., primary driver can select switches 26 on the cluster 22). On the other hand, the cluster 22 or the LDW module 70 prevents the secondary driver from disabling the LDW feature. In the event LDW switch 74 is used as a mechanism to enable/disable the LDW feature, the LDW module 70 receives the signal DRIVER_STATUS_1 from the cluster 22 to determine driver status. If the signal DRIVER_STATUS_1 indicates that the driver is the primary driver, then the LDW module 70 may enable/disable the LDW feature as desired via signals received from the LDW switch 74. If the signal DRIVER_STATUS_1 indicates that the driver is the secondary driver, then the LDW module 70 may not allow the secondary driver to enable/disable the LDW feature. In other words, the LDW module 70 forces the LDW feature on at all times in response to determining that the driver is the secondary driver. In this condition, the cluster 22 may notify the secondary driver that the LDW feature cannot be disabled to notify the secondary driver that the LDW switch 74 is functioning properly. In this implementation, the LDW module 70 may transmit a control signal in response to each detection of a signal input from the LDW switch 74 so that the cluster 22 can notify the secondary driver that the LDW switch 74 is functioning properly.

In another implementation, switches 26 on the cluster 22 may be used to control the LDW module 70 to enable/disable the LDW feature. In this implementation, the cluster 22 transmits a control signal (not shown) to the LDW module 70 to enable/disable the LDW feature (e.g., primary driver selects switches 26 and cluster 22 generates control signal in response thereto). In the event the cluster 22 determines that the driver is the secondary driver based on the signal DRIVER_STATUS, the cluster 22 inhibits the LDW disable option and prevents the secondary driver from viewing the enable/disable LDW feature in the message center display 24.

As noted above, the driver can select various sensitivity levels so that the LDW feature can be triggered at an early stage of the vehicle being detected to depart from the lane or at a later stage of the vehicle being detected to depart from the lane. In general, the driver may adjust the sensitivity to match his/her driving performance, which in turn may minimize false positives (or warnings). If the driver did not have the capability to adjust the sensitivity, and a number of false warnings are generated, then the driver may simply ignore the warnings. Such a selection may be made by the LDW switch 74 or by the switches 26 on the cluster 22.

Figure 2:
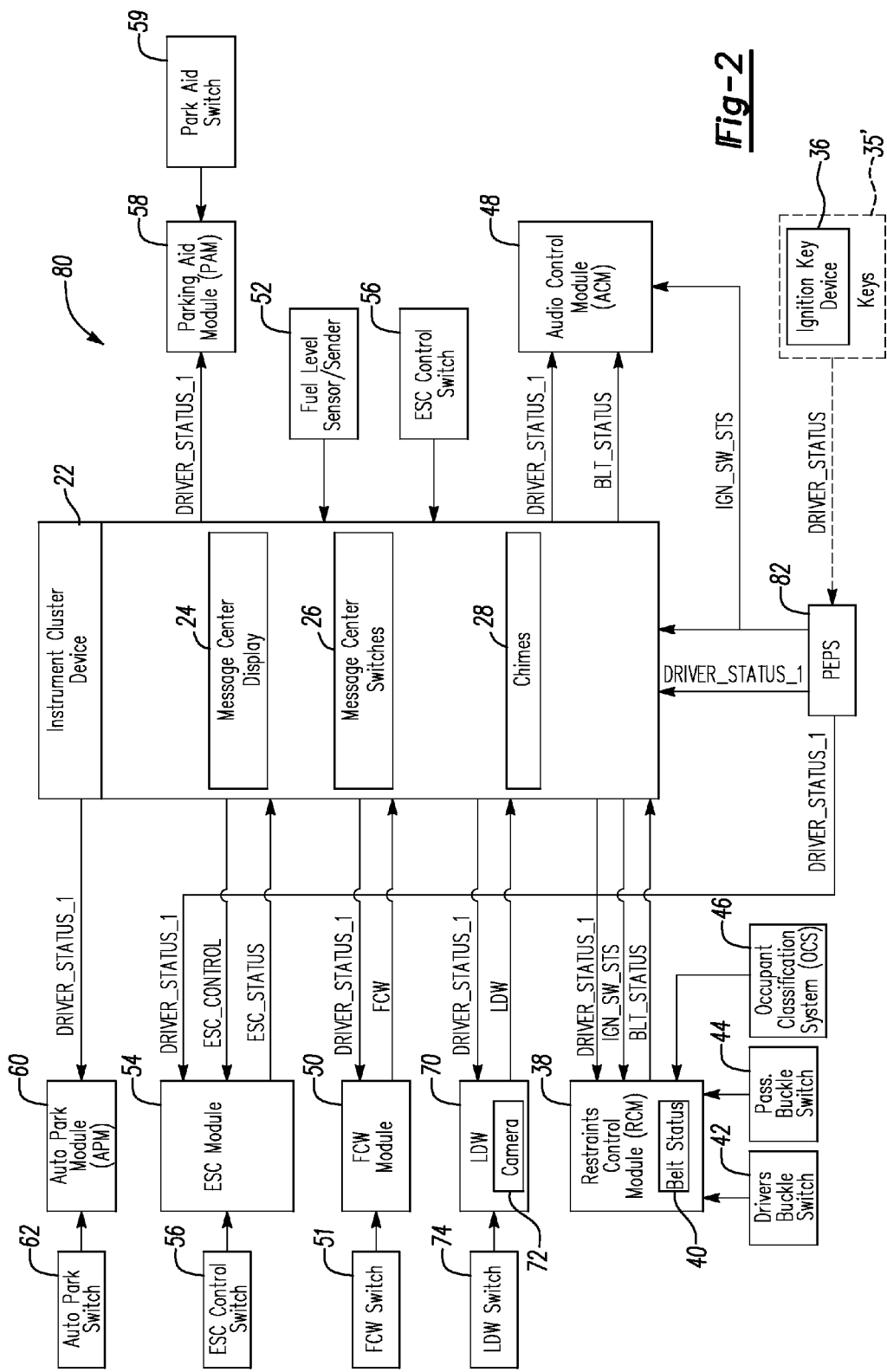
FIG. 2 depicts another system for differentiating between primary and secondary drivers of a vehicle and for controlling the operation of various safety and notification features based on the status of the driver in accordance to another embodiment of the present invention.

FIG. 2 depicts a system 80 for differentiating between primary and secondary drivers and for controlling the operation of various safety and notification features based on the status of the driver in accordance to another embodiment of the present invention. A passive entry passive start (PEPS) controller 82 may be operably coupled to the cluster 22. The PEPS controller 82 may be used in place of the PATS controller 30 as illustrated in FIG. 1. While FIG. 2 generally illustrates that the PEPS controller 82 is positioned external to the cluster 22, additional implementations may include positioning the PEPS controller 82 within the cluster 22. The particular placement of the PEPS controller 82 with respect to the cluster 22 may vary based on the desired criteria of a particular implementation.

In general, the PEPS function is a keyless access and start system. The driver may carry one or more keys 35' that may be in the form of an electronic transmission device. The keys 35' each include the ignition key device 36 embedded within for communicating with the PEPS controller 82. The transponder of the ignition key device 36 is adapted to send the RFID tags as the signal DRIVER_STATUS to the PEPS controller 82. To gain access or entry into the vehicle with the keys 35' in the PEPS implementation, the driver may need to wake up the PEPS controller 82 to establish bi-directional communication between the keys 35' and the PEPS controller 82. In one example, such a wake up may occur by requiring the driver to touch and/or pull the door handle of the vehicle. In response to the door handle being toggled or touched, the PEPS controller 82 may wake up and transmit RF based signals to the keys. The PEPS controller 82 and the keys 35' may undergo a series of communications back and forth to each other (e.g., handshaking) for vehicle access authentication purposes. The PEPS controller 82 may unlock the doors in response to a successful completion of the handshaking process. Once the driver is in the vehicle, the driver may simply press a button positioned on an instrument panel to start the vehicle.

The system 80 may be adapted to tag or associate the keys as either a primary or a secondary key during a learn operation as discussed with the PATS controller 30. As noted in connection with FIG. 1, while learning the keys to the vehicle during vehicle assembly or during repair, the keys 35' may be tagged as a primary key or a secondary key based on the sequential order in which the keys 35' are learned to the vehicle. For example, the PEPS controller 82 may assign the first key 84 that is learned to the vehicle as the primary key and the second key 84 that is learned to the vehicle as the secondary key. During vehicle startup, the keys 35' each transmit a corresponding RFID tag having hexidecimal-based data on the signal DRIVER_STATUS to the PEPS controller 82. The PEPS controller 82 may compare the hex data in the RFID tag to predetermined hex data in a lookup table of the PATS controller 30 to determine if a match occurs. If a match occurs, the PEPS controller 82 may allow the engine to start in the event the driver intends to start the vehicle.

In addition to the learn operation as discussed immediately above, the system 80 may tag or associate the keys by providing predetermined hex data in the RFID tag which corresponds to whether the key is a primary key or a secondary key as noted in connection with the PATS controller 30. The PEPS controller 82 receives the predetermined hex in the RFID tag and determines whether the key is a primary or a secondary key based on the predetermined hex data in the RFID tag.

Any number of additional keys may be tagged as either the primary or secondary key. For example, a plurality of replacement or spare keys may be learned to the vehicle and designated as either a primary or a secondary key. The PEPS controller 82 is adapted to provide the signal DRIVER_STATUS_1 to the various controllers over the communication bus. The signal DRIVER_STATUS_1 corresponds to whether the driver is the primary driver or the secondary driver. The PEPS controller 82 may also transmit the signal IGN_SW_STS to the cluster 22. The PEPS controller 82 determines that the key ignition status is in the run position in response to the driver toggling the brake pedal and depressing the start switch. In such a case, the vehicle is started and the PEPS controller 82 transmits the signal IGN_SW_STS as being in the run state. In the event the driver selects only the start button, the PEPS controller 82 transmits the signal IGN_SW_STS as being in the accessory state.

While FIGS. 1-2 generally disclose keys 35 and 35' that are used in connection with the PATS and PEPS implementations, respectively, it is contemplated that the keys may be implemented as a cell phone or other suitable device to gain entry into the vehicle or to start the vehicle. Such an electronic device may be associated to a particular person who can be classified as a primary driver and a secondary driver. In the event the keys are implemented as a cell phone, a receiver may receive data which can include information pertaining to driver identification which can be used to ascertain the identity of the driver. In another embodiment, the systems disclosed herein may include an auxiliary protocol interface module (APIM) (not shown). In one example, the APIM may be implemented as part of the SYNC system developed by Ford Motor Company and Microsoft®. The APIM may be wirelessly coupled to a cell phone that is used by the driver and may be adapted to identify the identity (e.g., primary or secondary driver) of the driver. For example, the driver may wirelessly link his/her cell phone to the APIM. In particular, the parent (or other administrative driver) can synchronize his/her cell phone to the APIM and designate this cell phone as belonging to the primary driver. The primary driver can then synchronize the cell phone belonging to the novice driver (or other secondary driver) to the APIM and designate as a secondary driver. Various prompts may be presented to the primary driver via the APIM when it is desired to link the cell phone(s) to the APIM. The APIM may transmit data over the bus indicating the identity of the driver (e.g., primary or secondary driver) to the cluster 22 or other module in the vehicle.

Figure 3:
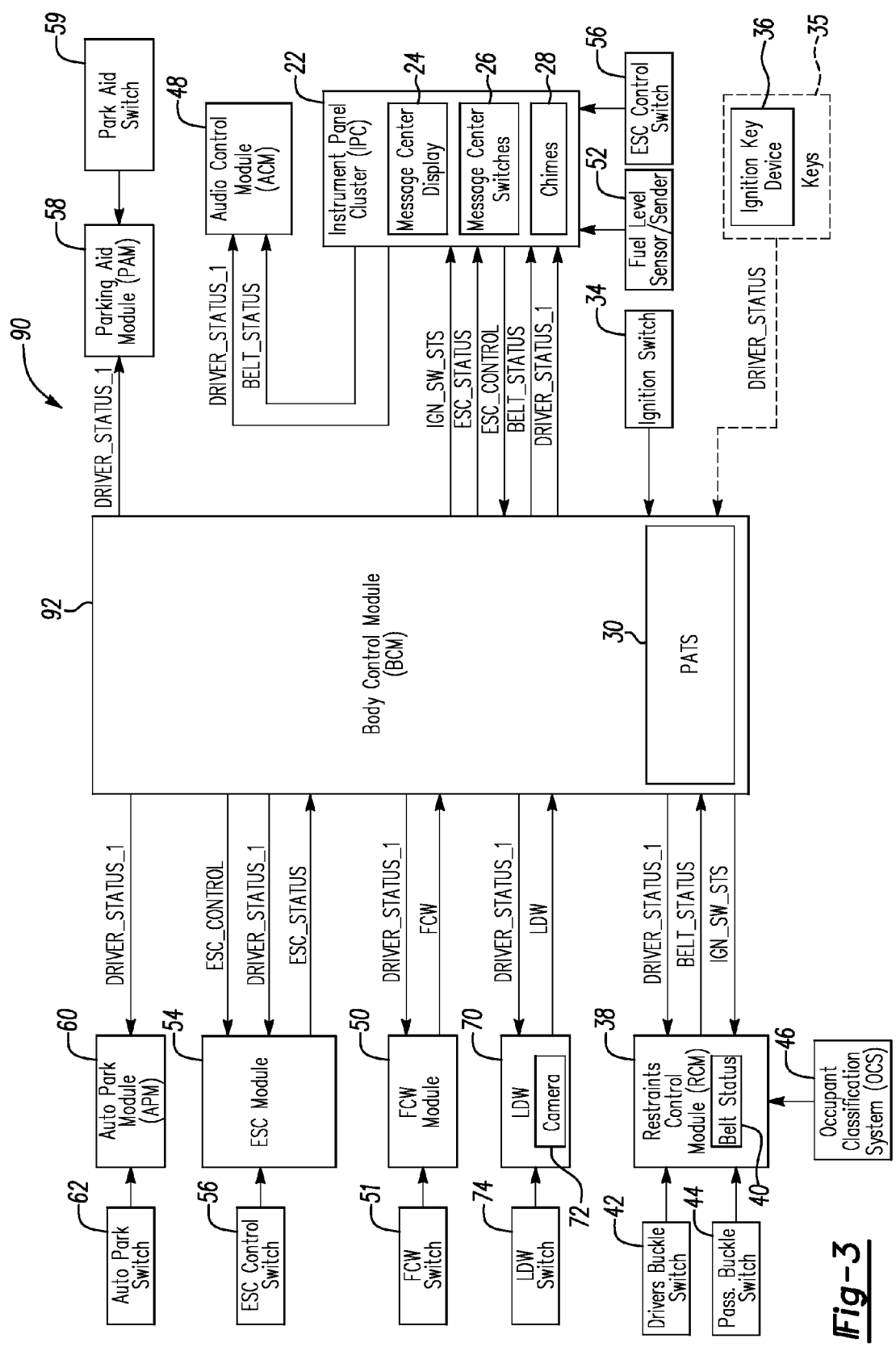
FIG. 3 depicts another system for differentiating between primary and secondary drivers of a vehicle and for controlling the operation of various safety and notification features based on the status of the driver in accordance to another embodiment of the present invention.

FIG. 3 depicts another system 90 for differentiating between primary and secondary drivers of a vehicle and for controlling the operation of various safety and notification features based on the status of the driver in accordance to another embodiment of the present invention. A body control module (BCM) 92 may be operably coupled to the cluster 22. The BCM 92 may be adapted to perform a number of interior body electrically based functions. For example, the BCM 92 may perform interior locking, remote keyless entry (RKE), interior/exterior lighting, wiper control (front and/or rear) and other such suitable functionality that is generally attributed to the interior electronics of the vehicle.

The PATS controller 30 may be positioned within the BCM 92. While FIG. 3 generally illustrates that the PATS controller 30 is positioned within the BCM 92, the PATS controller 30 may be positioned in the cluster 22 or any other controller or module shown in FIG. 3. In addition, the PATS controller 30 may be implemented as a standalone unit. The particular placement of the PATS controller 30 may be varied to meet the design criteria of a particular implementation. The PATS controller 30 may be coupled directly to the ignition switch 34. The BCM 92 may transmit the signal IGN_SW_STS to the cluster 22 via the communication bus. The BCM 92 may transmit and receive all signals as illustrated in FIG. 3 via the communication bus. Additionally, the cluster 22 may transmit and receive all signals as illustrated in FIG. 3 via the communication bus. The BCM 92 may be adapted to transmit the signal DRIVER_STATUS_1 to the cluster 22, the restraint control module 38, the seatbelt status controller 40, the audio control module 48, the ESC module 54, the parking aid module 58 and/or the auto park module 60. The cluster 22 inhibits FCW disable, the park aid disable, ESC disable, LDW disable, and provides for the early low fuel warning (or low battery charge warning) in response to the signal DRIVER_STATUS_1 indicating that the secondary driver is driving the vehicle. The seatbelt status controller 40 may inhibit the seatbelt status operation and prevent the secondary driver from disabling the operation in the event the secondary driver is determined to be the driver of the vehicle.

Figure 4:
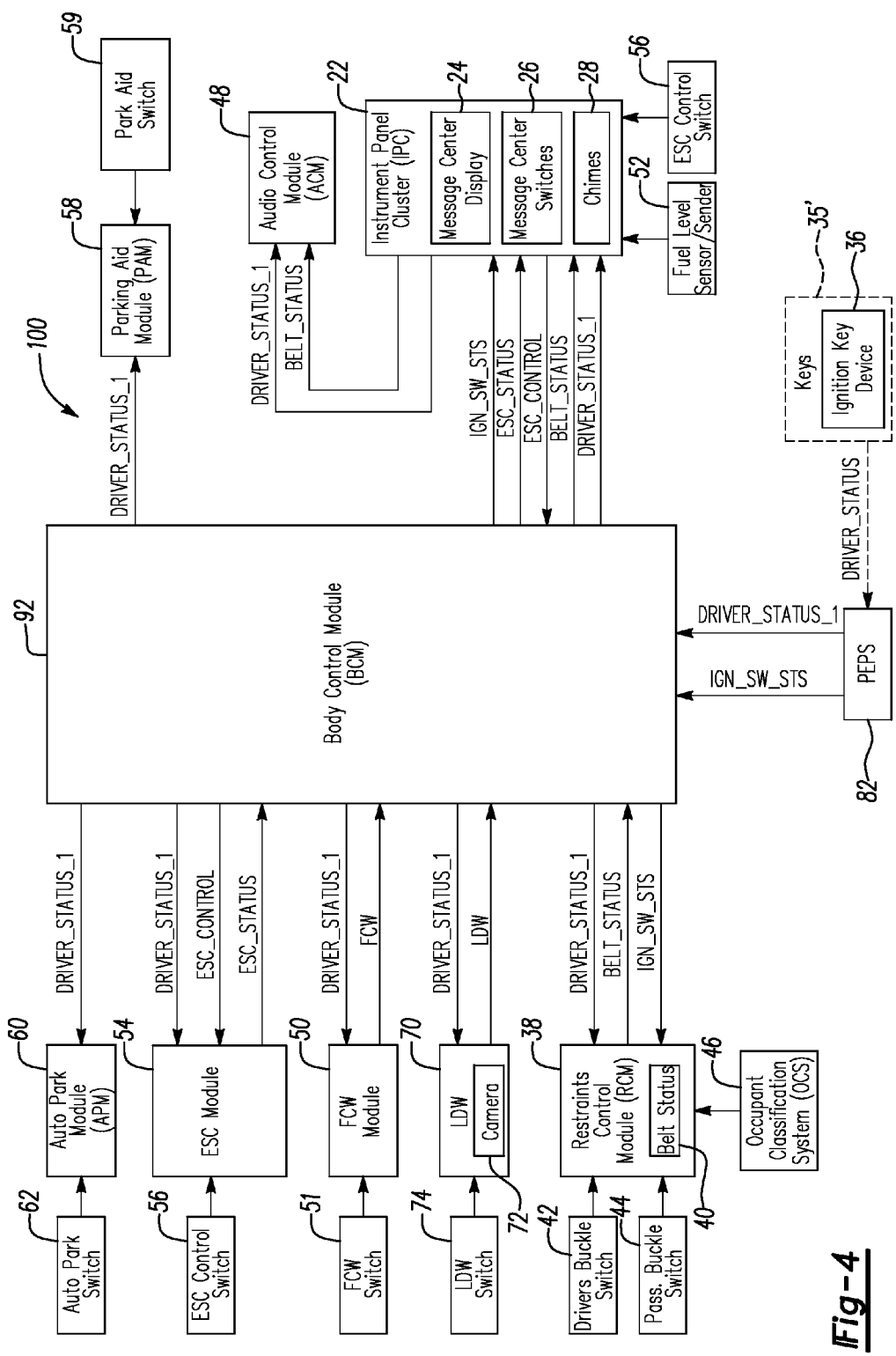
FIG. 4 depicts another system for differentiating between primary and secondary drivers of a vehicle and for controlling the operation of various safety and notification features based on the status of the driver in accordance to another embodiment of the present invention.

FIG. 4 depicts another system 100 for differentiating between primary and secondary drivers of a vehicle and for controlling the operation of various safety and notification features based on the status of the driver in accordance to another embodiment of the present invention. The PEPS controller 82 may be operably coupled to the BCM 92. The PEPS controller 82 may transmit the signals IGN_SW_STS and DRIVER_STATUS to the BCM 92. While FIG. 4 generally illustrates that the PEPS controller 82 is positioned external to the BCM 92, the PEPS controller 82 may be integrated into the BCM 92 or any other controller (or module) shown. The particular placement of the PEPS controller 82 may vary to meet the desired criteria of a particular implementation. As noted in FIG. 3, the BCM 92 may be adapted to transmit the signal DRIVER_STATUS_1 to the cluster 22, the restraint control module 38, the seatbelt status controller 40, the audio control module 48, the ESC module 54, the parking aid module 58 and/or the auto park module 60. The cluster 22 inhibits FCW disable, the park aid disable, ESC disable, LDW disable and provides for the early low fuel warning (or low battery charge warning) in response to the signal DRIVER_STATUS_1 indicating that the secondary driver is driving the vehicle. The seatbelt status controller 40 may inhibit the seatbelt status operation and prevent the secondary driver from disabling the operation in the event the secondary driver is determined to be the driver of the vehicle.

Figure 5:
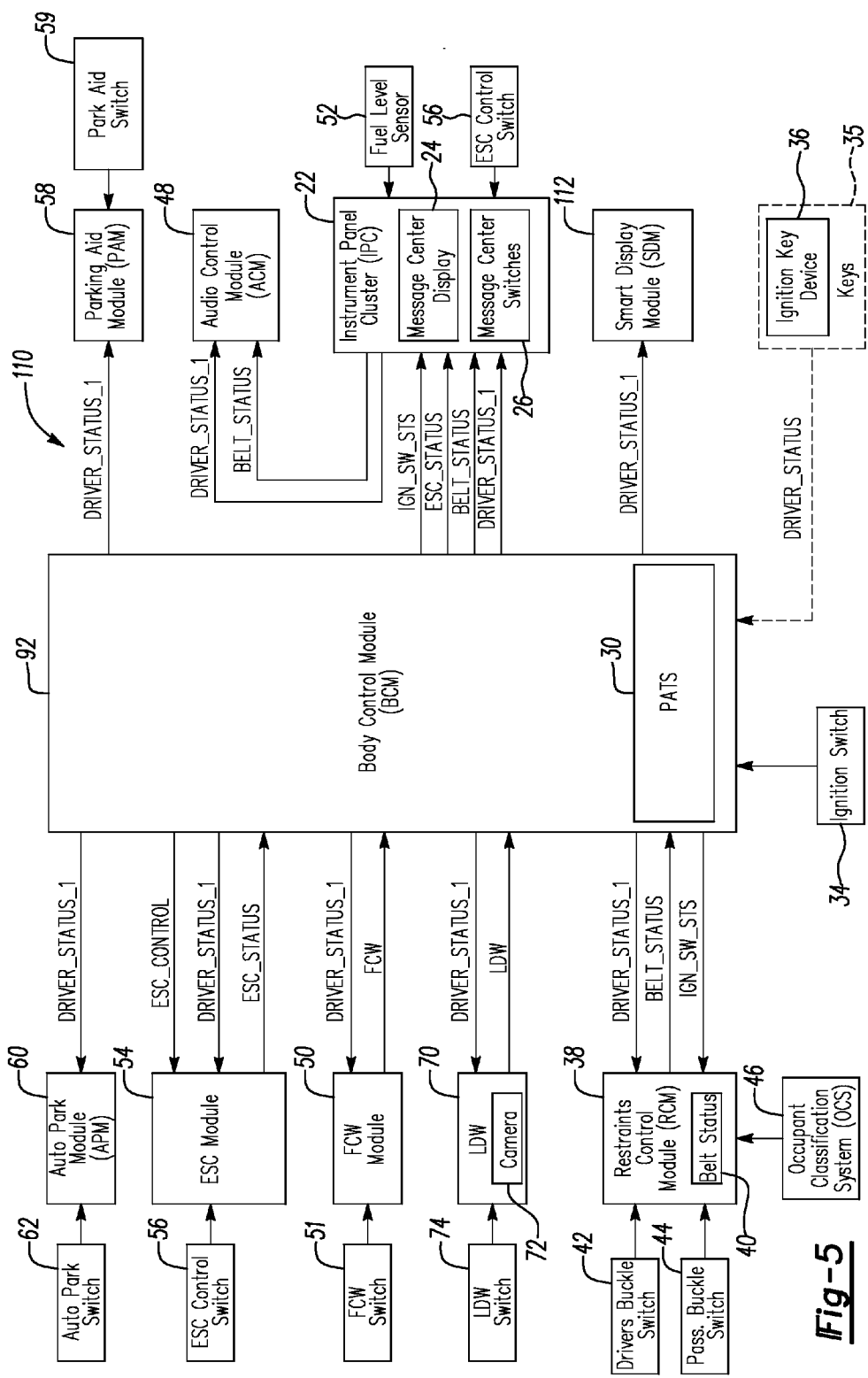
FIG. 5 depicts another system for differentiating between primary and secondary drivers of a vehicle and for controlling the operation of various safety and notification features based on the status of the driver in accordance to another embodiment of the present invention.

FIG. 5 depicts another system 110 for differentiating between primary and secondary drivers of a vehicle and for controlling the operation of various safety and notification features based on the status of the driver in accordance to another embodiment of the present invention. A smart display module 112 may be operably coupled to the cluster 22 and the BCM 92. The smart display module (SDM) 112 may be implemented as a monitor having a screen. The SDM 112 may visually present messages to the driver. In addition, a driver may touch different fields on the screen of the SDM 112 to select options for different vehicle related features. In one example, the message center switches 26 of the cluster 22 may be replaced by the SDM 112. The SDM 112 may be implemented separately from the cluster 22. The SDM 112 may be packaged in a center stack area of the instrument panel above the audio control module 48 and a climate control module (not shown). The SDM 112 may provide and is not limited to the following: allowing the driver to enable/disable default and configurable settings such as enabling/disabling the seatbelt status, enabling/disabling the parking aid, enabling/disabling one or more of the ESC features and enabling/disabling the LDW feature. While not shown, the SDM 112 may transmit control signals (not shown) to the seatbelt status controller 40, the parking aid module 58 and the ESC module 54. The SDM 112 may also allow the driver to select various administrative menu options and save administrative settings which relate to the driver status functionality. The SDM 112 may not require for the user to have to toggle through a plurality of options to select a particular option as may be necessary with the message center switches 26 of the message center. The SDM 112 may also display a driver status message during vehicle start up and a seatbelt warning message. In one example, the SDM 112 may be configured to display any messages traditionally displayed by the message center display 24. In another example, the message center display 24 may be implemented along with the SDM 112.

The BCM 92 may provide the signal DRIVER_STATUS_1 to the SDM 112. In the event the signal DRIVER_STATUS_1 corresponds to the primary driver, the cluster 22 and/or the SDM 112 may allow the primary driver to enable/disable ESC, FCW, parking aid, and LDW. The cluster 22 may use the signal DRIVER_STATUS_1 to maintain the normal low fuel warning strategy (or normal low battery charge warning) in the event the signal DRIVER_STATUS_1 corresponds to the primary driver. In the event the signal DRIVER_STATUS_1 corresponds to the secondary driver, the SDM 112 may not allow the secondary driver to inhibit the seatbelt status disable, TC disable, ESC disable, FCW disable, park aid disable, and LDW disable or other safety or notification feature disable. The cluster 22 may change the strategy with respect to issuing the low fuel warning strategy (or low battery charge warning) at an earlier point in time if the signal DRIVER_STATUS corresponds to the secondary driver.

Figure 6:
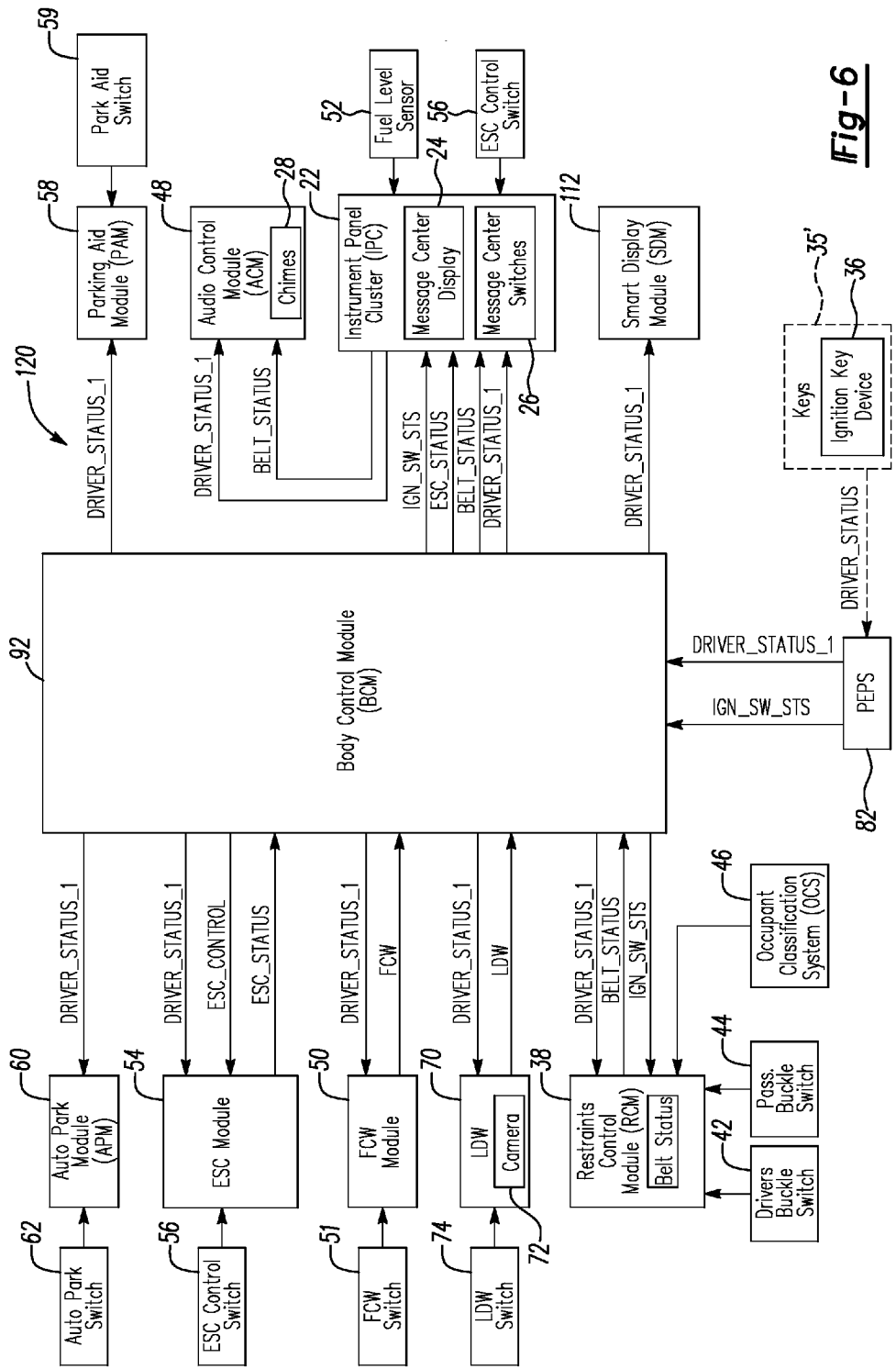
FIG. 6 depicts another system for differentiating between primary and secondary drivers of a vehicle and for controlling the operation of various safety and notification features based on the status of the driver in accordance to another embodiment of the present invention.

FIG. 6 depicts another system 120 for differentiating between primary and secondary drivers of a vehicle and for controlling the operation of various safety and notification features based on the status of the driver in accordance to another embodiment of the present invention. The system 120 is similar to the system 110 with the exception of the PEPS controller 82 being implemented in place of the PATS controller 30. While FIG. 6 generally illustrates that the PEPS controller 82 is implemented as a standalone controller, the PEPS controller 82 may be implemented into any of the controllers or modules shown.

The PEPS controller 82 may determine the driver status in response to the signal DRIVER_STATUS transmitted from the ignition key device 36 and transmit the signal DRIVER_STATUS_1 to the BCM 92. The BCM 92 transmits the signal DRIVER_STATUS_1 to the SDM 112. The SDM 112 and/or the cluster 22 may allow the primary driver to enable/disable ESC, FCW, parking aid feature, LDW or other safety or notification feature. The cluster 22 may use the DRIVER_STATUS_1 to maintain the normal low fuel warning strategy (or low battery charge warning) in the event the signal DRIVER_STATUS_1 corresponds to the primary driver. In the event the signal DRIVER_STATUS_1 corresponds to the secondary driver, the SDM 112 may not allow the secondary driver to inhibit the seatbelt status disable, ESC disable, FCW disable, park aid disable, LDW or other safety or notification related feature. In addition, the cluster 22 may change the strategy with respect to issuing the low fuel warning strategy (or low battery charge warning) at an earlier point in time if the signal DRIVER_STATUS corresponds to the secondary driver.

FIG. 7 depicts a block diagram 200 for displaying a message to notify drivers of the driver status mode. In block 202, the driver inserts the key into the ignition. For systems 20, 90 and 110, the key ignition switch 34 transmits the signal IGN_SW_STS to the SPDJB 32 or the BCM 92 (see FIGS. 1, 3, and 5). The BCM 92 transmits a message of the signal IGN_SW_STS over the communication bus. For systems 80, 100 and 120, the PEPS controller 82 transmits the signal IGN_SW_STS over the communication bus to the various controllers or modules (see FIGS. 2, 4, and 6).

In block 204, the keys are monitored to determine if the keys were programmed. The PATS controller 30 or the PEPS controller 82 is adapted to determine if the keys are properly programmed so that the vehicle can be started. The PATS controller 30 or the PEPS controller 82 is also adapted to determine if the keys correspond to either the primary or secondary driver. In the event the keys are not properly programmed to start the vehicle, then the diagram 200 moves to block 206. In the event the keys are properly programmed to start the vehicle, then the diagram 200 moves to block 208.

In block 206, an error is detected. The PATS controller 30 or the PEPS controller 82 determines an error and may not allow the driver to start the vehicle.

In block 208, a vehicle start is monitored. For the systems 20, 90 and 110, the SPDJB 32 or the BCM 92 determines whether the ignition switch 34 is in the start position. For systems 80, 100 and 120, the PEPS controller 82 determines whether the vehicle is started. If the vehicle is started, then the diagram 200 moves to block 210. If the vehicle has not been started, then the diagram moves back to block 204.

In block 210, the cluster 22 determines if the key was programmed as a primary key for the primary driver or if the key was programmed as a secondary key for the secondary driver. If the key is determined to be a primary key, then the diagram 200 moves to block 212. If the key is determined to be a secondary key, then the diagram 200 moves to block 214. In the event the key is not programmed as a primary or secondary key, the diagram 200 moves to block 212.

In block 212, the vehicle resumes standard vehicle function and no display regarding driver status is presented to the driver.

In block 214, a driver status message is presented to the driver. For systems 20, 80, 90 and 100, the message center display 24 of the cluster 22 displays the driver status message to the primary or secondary drivers. For systems 110 and 120, the SDM 112 displays the driver status startup message to the primary or secondary drivers. In general, the driver status message may be useful in the situation whereby the primary driver accidentally uses the secondary key to start the vehicle. In such an example, a driver status message may be presented thereby notifying the primary driver that the vehicle may have limited override capability with respect to enabling and disabling the safety and notification features of the vehicle.

FIG. 8 depicts a block diagram 250 for inhibiting the seatbelt status operation based on the status of the driver. In block 252, the driver inserts the key into the ignition. For systems 20, 90 and 110, the key ignition switch 34 transmits the signal IGN_SW_STS to the SPDJB 32 or the BCM 92 (see FIGS. 1, 3, and 5). The SPDJB 32 of the BCM 92 transmits the signal IGN_SW_STS over the communication bus. For systems 90, 100 and 120, the PEPS controller 82 transmits the signal IGN_SW_STS over the communication bus to the various controller or module (see FIGS. 2, 4, and 6).

In block 254, the keys are monitored to determine if the keys were programmed to start the vehicle. The PATS controller 30 or the PEPS controller 82 is adapted to determine if the keys are properly programmed so that the vehicle can be started. The PATS controller 30 or the PEPS controller 82 is also adapted to determine if the keys correspond to either the primary or the secondary driver. In the event the keys are not programmed or valid to start the vehicle, the diagram 250 moves to block 256. In the event the keys are properly programmed, the diagram 250 moves to block 258.

In block 256, an error is detected. The PATS controller 30 or the PEPS controller 82 determines an error and may not allow the driver to start the vehicle in the event the keys are not properly programmed to start the vehicle.

In block 258, the RCM 38 determines if the key was programmed as a primary key for the primary driver or if the key was programmed as a secondary key for the secondary driver. If the key is determined to be a primary key, then the diagram 250 moves to the block 260. If the key is determined to be a secondary key, then the diagram 250 moves to the block 262. If the key is not associated with a primary driver or a secondary driver, then the diagram 250 moves back to block 260.

In block 260, the primary driver may resume the current belt status configuration. The primary driver has the option of disabling and enabling the seatbelt status as desired. The seatbelt status controller 40, if left on (or enabled) by the primary driver, may optionally mute the ACM 48 in the event the seatbelt warning is issued both visually and audibly if the primary driver is not buckled and the rest of the applicable vehicle criteria is met. The seatbelt status controller 40 may continue to visually and audibly warn the primary driver and optionally mute the ACM 48 for a predetermined amount of time and then expire in the event the primary driver ignores the warnings. In addition, if the key was not programmed as either a primary key or a secondary key, the current belt status is maintained and the driver of the vehicle may have the option of disabling and enabling the seatbelt status as desired.

In block 262, the seatbelt status controller 40 inhibits the seatbelt status override feature for the secondary driver. In other words, the seatbelt status controller 40 may not allow the secondary driver to disable the seatbelt status feature or operation.

In block 264, the seatbelt status controller 40 inhibits the seatbelt status time feature for the secondary driver. If the secondary driver ignores the warnings that his/her seatbelt is not buckled, the warning may resume until the seatbelt is buckled (i.e., the seatbelt warnings will not expire). For example, the seatbelt status controller 40 prevents the secondary driver from adjusting the time interval as to when the driver is notified of an unbuckled seat belt.

In block 266, the audio control module 48 is muted when the seatbelt status notifies the driver that one or more of the seatbelts are not buckled. For system 20, 80; the seatbelt status controller 40 transmits the signal BLT_STATUS to the audio control module 48 via the cluster 22 (see FIGS. 1-2). For system 90, 100, 110 and 120, the seatbelt status controller 40 transmits the signal BLT_STATUS to the audio control module 48 via the cluster 22 and the BCM 92 (see FIGS. 3-6). In general, the seatbelt status controller 40 transmits the signal BLT_STATUS to the audio control module 48 to turn off audio (except for (i) cell phone conversation, (ii) when a voice recognition session is active, and (iii) when navigation voice directions are being given) generated from the audio control module 48 (e.g., music, news, weather, etc.) and to audibly notify the secondary driver of the seatbelt unbuckled status. The ACM 48 may remain in a muted state while the seatbelts of the secondary driver are unbuckled. In addition, the seatbelt status controller 40 monitors the particular positioning of occupants seated throughout the vehicle via the occupant classification system 46. In the event the driver is the secondary driver and one or more of the seats which include an occupant unbuckles his/her seatbelt, the ACM 48 is muted and the secondary driver is audibly and visually warned that any one or more of the seatbelts of the occupants are unbuckled. The warning may remain on until the secondary driver and/or the vehicle occupants buckle their respective seatbelts. The seatbelt warning is generally issued when the seatbelts are detected to be unfastened and when a predetermined vehicle speed is achieved (e.g., 6 kph). The particular value used for the predetermined vehicle speed may be varied to meet the desired criteria of a particular implementation.

In block 268 the cluster 22 or the SDM 112 displays the seatbelt warning message which corresponds to one or more seatbelts not being in a buckled state. The seatbelt warning message may be displayed via a telltale in the cluster, the message center and/or in a visual indicator on the ACM 48.

In block 270 the seatbelt status controller 40 monitors the driver's and passenger's buckle switch 42, 44 to detect seatbelt buckle status or waits for the seatbelt to be fastened.

FIG. 9 depicts a block diagram 300 for providing a fuel level warning based on the status of the driver. In block 302, the driver inserts the key into the ignition. For systems 20, 90 and 110, the key ignition switch 34 transmits the signal IGN_SW_STS to the SPDJB 32 or the BCM 92 (see FIGS. 1, 3, and 5). The SPDJB 32 of the BCM 92 transmits a message of the signal IGN_SW_STS over the communication bus. For systems 80, 100 and 120, the PEPS controller 82 transmits the signal IGN_SW_STS over the communication bus to the various controllers or modules (see FIGS. 2, 4, and 6).

In block 304, the keys are monitored to determine if the keys were programmed to start the vehicle. The PATS controller 30 or the PEPS controller 82 is adapted to determine if the keys are valid for starting the vehicle. The PATS controller 30 or the PEPS controller 82 is also adapted to determine if the keys correspond to either the primary or the secondary driver. In the event the keys are not programmed or valid to start the vehicle, the diagram 300 moves to block 306. In the event keys are properly programmed, the diagram 300 moves to block 308.

In block 306, an error is detected. The PATS controller 30 or the PEPS controller 82 determines an error and may not allow the driver to start the vehicle in the event the keys are not properly programmed to the vehicle.

In block 308, the cluster 22 determines if the key was tagged as a primary key for the primary driver or if the key was tagged as the secondary key for the secondary driver. If the key is determined to be a primary key, then the diagram

300 moves to block 310. If the key is determined to be the secondary key, then the diagram 300 moves to block 312. If the key is not associated with a primary or a secondary driver, then the diagram 300 moves to the block 310.

In block 310, the cluster 22 uses the standard DTE as the threshold for determining when to activate the low fuel warning. As noted above, the cluster 22 may also activate a warning to indicate a low charge for a hybrid or electric vehicle at an earlier state for the secondary driver than that provided for the primary driver. The cluster 22 activates the low fuel warning in response to determining that the fuel level is less than the DTE. The cluster 22 may display the low fuel warning in the message center display 24. The cluster 22 may also activate the low battery charge warning in response to determining that the charge of the battery(s) is less then the first threshold that is established for the secondary driver. The first threshold may correspond to a charge status that is greater than the charge status used for the primary driver. Such a condition may ensure that the secondary driver is properly notified of the charge status and may give the secondary driver earlier notice to perhaps charge the battery(s) well in advance of the battery(s) being depleted.

The chimes 28 of the cluster 22 may also be active when displaying the low fuel warning or low battery charge. In one example, the standard DTE corresponds to a distance to empty of approximately fifty miles to empty. The standard distance to empty may be varied to meet the design criteria of a particular implementation. Additional examples may also include the SDM 112 displaying the low fuel warning (or low battery charge warning).

In block 312, the cluster 22 modifies the low fuel warning strategy such that the low fuel warning is activated when the fuel level is below the DTE multiplied by a predetermined value. In one example, the DTE may be fifty miles to empty and the predetermined value may be one and a half. Based on such an example, the cluster 22 may display the low fuel warning when the fuel tank is seventy-five miles to empty. The low fuel warning is generally issued earlier for the secondary driver. The particular value for the predetermined value may be varied to meet the desired criteria of a particular implementation.

FIG. 10 depicts a block diagram 350 for inhibiting electronic stability control (ESC) features based on the status of the driver. In block 352, the driver inserts the key into the ignition. For systems 20, 90 and 110, the key ignition switch 34 transmits the signal IGN_SW_STS to the SPDJB 32 or the BCM 92 (see FIGS. 1, 3, and 5). The SPDJB 32 of the BCM 92 transmits a message of the signal IGN_SW_STS over the communication bus. For systems 80, 100 and 110, the PEPS controller 82 transmits the signal IGN_SW_STS over the communication bus to the various controllers or modules (see FIGS. 2, 4, and 6).

In block 354, the keys are monitored to determine if the keys were programmed to start the vehicle. The PATS controller 30 or the PEPS controller 82 is adapted to determine if the keys are properly programmed so that the vehicle can be started. The PATS controller 30 or the PEPS controller 82 is also adapted to determine if the keys correspond to either the primary or the secondary driver. In the event the keys are not programmed or valid to start the vehicle, then the diagram 350 moves to block 356. In the event keys are properly programmed, then the diagram 350 moves to block 358.

In block 356, an error is detected. The PATS controller 30 or the PEPS controller 82 determines an error and may not allow the driver to start the vehicle in the event the keys are not properly programmed to the vehicle.

In block 358, the cluster 22 or the ESC module 54 determines if the key was programmed as a primary key for the primary driver or if the key was programmed as a secondary key for the secondary driver. If the key is determined to be the primary key, then the diagram 350 moves to the block 360. If the key is determined to be the secondary key, then the diagram 350 moves to the block 362. If the key is determined not to be tagged to or programmed to either driver, then the diagram 350 moves to the block 359.

In block 359, the vehicle resumes normal operation and allows the driver to enable/disable the ESC function. The driver in this case has no administrative rights since the driver is not recognized as a primary or secondary driver.

In block 360, the primary driver may enable/disable any one or more ESC features (e.g., YSC, RSC or TC) via the ESC control switch 56 or the message center switch 26. It is generally assumed that the ESC feature defaults to "ON" for each new ignition cycle. For systems 20 and 80, in the event the ESC control switch 56 is coupled to the cluster 22, the cluster 22 processes the data from the ESC control switch 56 and sends out the signal ESC_CONTROL to the ESC module 54. The ESC module 54 disables/enables one or more ESC features in response to the signal ESC_CONTROL. In the event the ESC control switch 56 is coupled directly to the ESC module 54, the ESC module 54 processes information received from the ESC control switch 56 and enables/disables the operation of one or more of the ESC features in response to the ESC control switch 56.

For systems 90, 100, 110 and 120, the operation is similar to systems 20 and 80 with the exception that the that the BCM 92 may transmit/receive the signals ESC_CONTROL and/or ESC_STATUS to/from the cluster 22 and the ESC module 54. In the event the vehicle does not include the ESC switch, the message center switch 26 may be used to enable the ESC function. The cluster 22 transmits the signal ESC_CONTROL to the ESC module 54.

In block 362, the cluster 22 may allow the primary driver to give the option of enabling/disabling the one or more ESC features to the secondary driver. For example, the primary driver may via the cluster 22 or the SDM 112 select an option for allowing the secondary driver to enable/disable the one or more ESC features. In the event the primary driver selects the option for allowing the secondary driver to enable/disable the one or more ESC features, then the diagram 350 moves to block 364. In the event the primary driver prevents the secondary driver from enabling/disabling the one or more features ESC, then the diagram moves to block 366.

In block 364, the secondary driver may enable/disable the ESC operation as desired. For example, the primary driver may allow the secondary driver the option of disabling the TC in the event the secondary driver experiences road conditions which may facilitate disabling TC. In one example, the secondary driver may disable TC in the event the secondary driver experiences ice or dirt on a road.

In block 366, the secondary driver is prevented from enabling/disabling the one or more ESC features.

In block 368, the cluster 22 or the SDM 112 determines if the secondary driver attempts to enable/disable ESC via the ESC control switch 56. In the event the cluster 22 or the SDM 112 determines that the secondary driver attempts to enable/disable the one or more ESC features via the ESC control switch 56, the diagram 350 moves to block 370. In the event the secondary driver does not attempt to enable/disable the one or more ESC features, the diagram 350 moves to block 372.

In block 370, the cluster 22 or the SDM 112 transmits a ESC driver status message. The message may be in the form of a telltale on the cluster 22 or a message displayed via the message center display 24 or in the SDM 112.

In block 372, no display is provided to the secondary driver since the secondary driver has not attempted to enable/disable the one or more ESC features.

Figure 11:
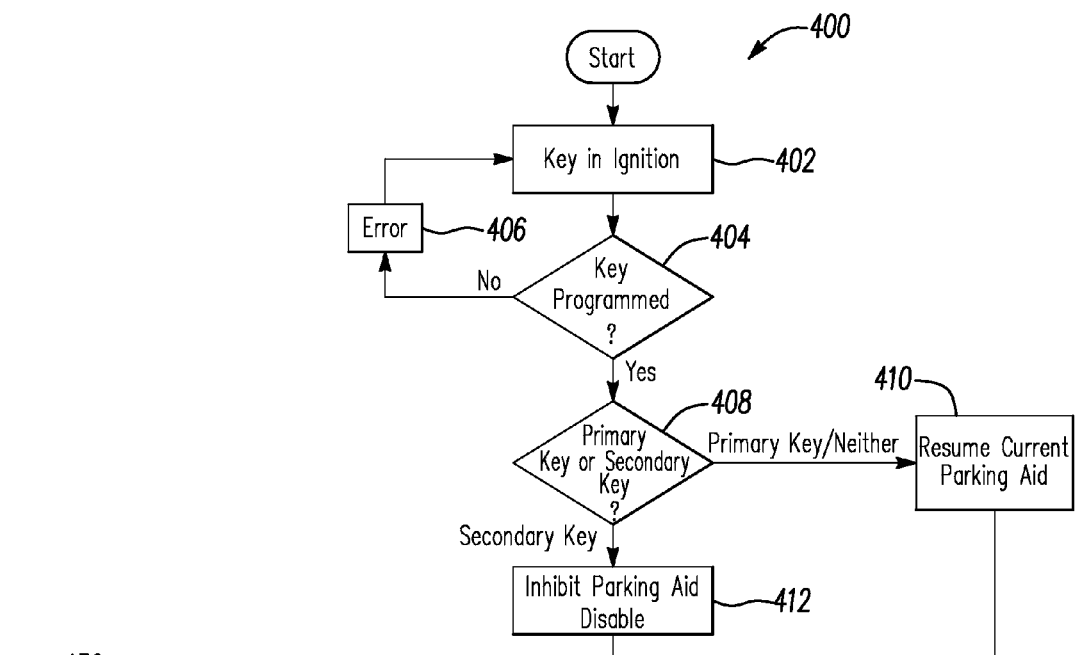
FIG. 11 depicts a block diagram for inhibiting park aid disable based on the status of the driver.

FIG. 11 depicts a block diagram 400 for inhibiting park aid disable based on the status of the driver. In block 402, the driver inserts the key into the ignition. For systems 20, 90 and 110, the key ignition switch 34 transmits the signal IGN_SW_STS to the SPDJB 32 or the BCM 92 (see FIGS. 1, 3, and 5). The SPDJB 32 or the BCM 92 transmits a message of the signal IGN_SW_STS over the communication bus. For systems 80, 100 and 120, the PEPS controller 82 transmits the signal IGN_SW_STS over the communication bus (see FIGS. 2, 4, and 6) to the various controllers.

In block 404, the keys are monitored to determine if the keys were programmed to start the vehicle. The PATS controller 30 or the PEPS controller 82 is adapted to determine if the keys are valid for starting the vehicle. The PATS controller 30 or the PEPS controller 82 is also adapted to determine if the keys correspond to either the primary or the secondary driver. In the event the keys are not programmed or valid to start the vehicle, the diagram 400 moves to block 406. In the event the keys are properly programmed, the diagram 400 moves to block 408.

In block 406, the PATS controller 30 or the PEPS controller 82 determines an error and may not allow the driver to start the vehicle in the event the keys are not programmed to the vehicle.

In block 408, the cluster 22 determines if the key was programmed as a primary key for the primary user or if the key was programmed as a secondary key for the secondary user. If the key is determined to be a primary key for the primary driver, then the diagram 400 moves to the block 410. If the key is determined to be a secondary key for the secondary driver, then the diagram 400 moves to the block 412. If the key is determined not to be tagged to or programmed to either driver, then the diagram 400 moves to block 406.

In block 410, the primary driver may enable/disable the park aid feature as desired. In one example, the primary driver may enable/disable the park aid via the message centers switches 26 in the cluster 22. In such a case, the cluster 22 may transmit a control signal to the parking aid module 58 to enable/disable the park aid feature. Alternatively, the primary driver may enable/disable the park aid feature via the SDM 112 as desired. In such a case, the SDM 112 may transmit a control signal to the parking aid module 58 to enable/disable the park aid feature. In yet another example, the primary driver may enable/disable the park aid feature via the park aid switch 59. The parking aid system generally defaults "ON" for each new ignition cycle. As such, the primary driver may have to disable the parking aid after each ignition cycle in the event such an action is desired.

In block 412, the cluster 22 inhibits the parking aid disable for the secondary driver. In other words, the cluster 22 may not display a prompt to allow the secondary user to enable/disable the park aid feature. Alternatively, the SDM 112 may not display the prompt to allow the secondary user to enable/disable the park aid feature. The inhibit disable function is accomplished by masking the standard menu option in the cluster 22 or the SDM 112.

In block 414, the cluster 22 or the SDM 112 displays a driver status park aid message in place of the standard menu option which may be presented to the primary driver which generally allows the primary driver to enable/disable the park aid feature. In the event the secondary driver attempts to disable the park aid feature via the park aid switch 59, the cluster 22 or the SDM 112 may display the driver status park aid message.

Figure 12:
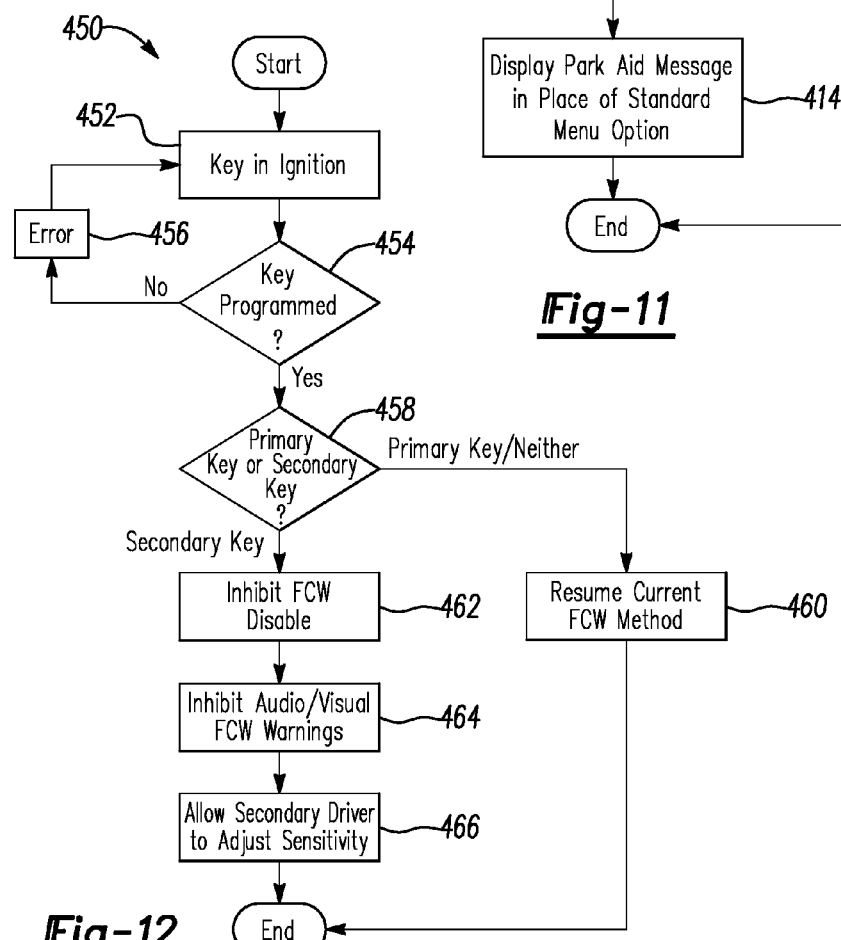
FIG. 12 depicts a block diagram for inhibiting forward collision warning disable based on the status of the driver.

FIG. 12 depicts a block diagram 450 for inhibiting the forward collision warning (FCW) based on the status of the driver. In block 452, the driver inserts the key into the ignition. For systems 20, 90 and 110, the key ignition switch 34 transmits the signal IGN_SW_STS to the SPDJB 32 or the BCM 92 (see FIGS. 1, 3, and 5). The SPDJB 32 or the BCM 92 transmits a message of the signal IGN_SW_STS over the communication bus. For systems 80, 100 and 120, the PEPS controller 82 transmits the signal IGN_SW_STS over the communication bus to the various controllers or modules (see FIGS. 2, 4, and 6).

In block 454, the keys are monitored to determine if the keys were programmed to start the vehicle. The PATS controller 30 or the PEPS controller 82 is adapted to determine if the keys are valid for starting the vehicle. The PATS controller 30 or the PEPS controller 82 is also adapted to determine if the keys correspond to either the primary or the secondary driver. In the event the keys are not programmed or valid to start the vehicle, then the diagram 450 moves to block 456. In the event the keys are properly programmed, then the diagram 450 moves to block 458.

In block 456, an error is detected. The PATS controller 30 or the PEPS controller 82 determines an error and may not allow the driver to start the vehicle in the event the keys are not programmed to the vehicle.

In block 458, the cluster 22 determines if the key was programmed as a primary key for the primary user or if the key was programmed as a secondary key for the secondary user. If the key is determined to be a primary key for the primary driver, then the diagram 450 moves to the block 460. If the key is determined to be a secondary key for the secondary driver, then the diagram 450 moves to the block 462. If the key is determined not to be tagged to or programmed to either driver, then the diagram 450 moves to block 460.

In block 460, the primary driver may enable/disable the forward collision warning (FCW) as desired. In one example, the primary driver may enable/disable the FCW feature via the message center switches 26 in the cluster 22. In such a case, the cluster 22 may transmit a control signal to the FCW module 50 to enable/disable the FCW warning feature. Alternatively, the primary driver may enable/disable the FCW feature via the SDM 112 as desired. In such a case, the SDM 112 may transmit a control signal to the FCW module 50 to enable/disable the FCW warning feature. In yet another example, the primary driver may enable/disable the FCW feature via the FCW switch 51. The primary driver is generally capable of separately enabling/disabling the audible, chime, visual indicator and/or the sensitivity level of the FCW feature. The FCW generally defaults to the last known state for the primary driver (or previous state in previous ignition cycle) for each new ignition cycle.

In block 462, the cluster 22 inhibits FCW disable for the secondary driver. In other words, the cluster 22 may not display a prompt to allow the secondary user to enable/disable the FCW feature. Alternatively, the SDM 112 may not display the prompt to allow the secondary user to enable/disable the FCW feature. The inhibit disable function is accomplished by masking the standard menu option in the cluster 22 or the SDM 112.

In block 464, the cluster 22 or the SDM 112 displays a driver status FCW message in place of the standard menu option which is generally presented to the primary driver which allows the primary driver to enable/disable the FCW feature. If the secondary driver attempts to disable the FCW feature via the FCW switch 51, the message center display 24 or the SDM 112, the cluster 22 or the SDM 112 displays the driver status FCW message.

In block 466, the cluster 22 or the SDM 112 allows the secondary driver to adjust the FCW sensitivity. For example, the cluster 22 may provide a prompt via the message center display 24 of the cluster 22 to allow the secondary driver to adjust the FCW sensitivity. The secondary driver may select the FCW sensitivity via the message center switches 26. In such a case, the cluster 22 may transmit a control signal to the FCW module 50 to change the sensitivity. In another example, the SDM 112 may allow the secondary driver the option of adjusting FCW sensitivity. In such a case, the SDM 112 may transmit a control signal to the FCW module 50 to change the sensitivity. In yet another example, the secondary driver may adjust the sensitivity of the FCW via the FCW switch 51.

Figure 13:
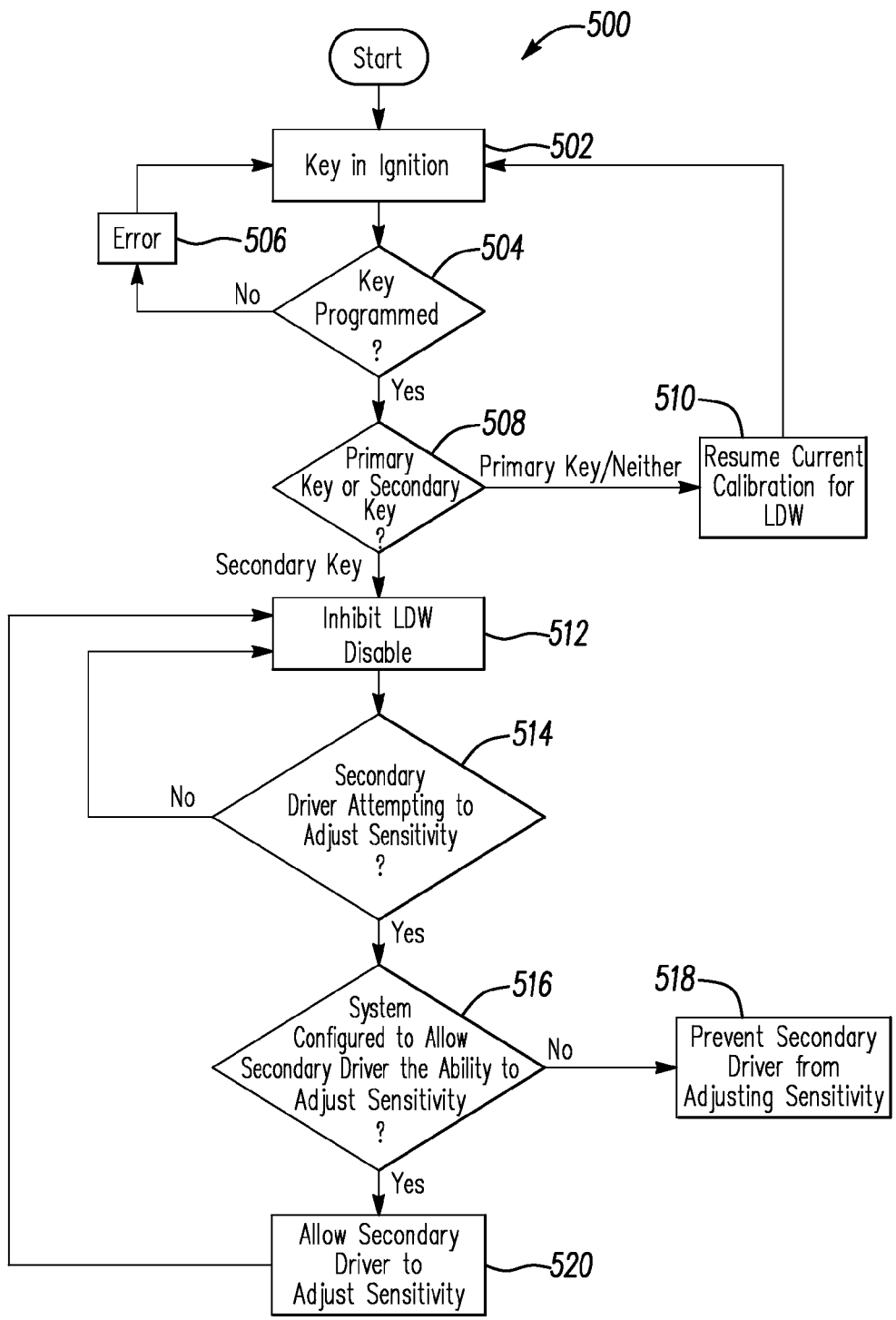
FIG. 13 depicts a block diagram for inhibiting lane departure warning disable based on the status of the driver.

FIG. 13 depicts a block diagram 500 for inhibiting the LDW based on the status of the driver. In block 502, the driver inserts the key into the ignition. For systems 20, 90 and 110, the key ignition switch 34 transmits the signal IGN_SW_STS to the SPDJB 32 or the BCM 92 (see FIGS. 1, 3, and 5). The SPDJB 32 or the BCM 92 transmits a message of the signal IGN_SW_STS over the communication bus. For systems 80, 100 and 120, the PEPS controller 82 transmits the signal IGN_SW_STS over the multiplexed bus (see FIGS. 2, 4, and 6) to the various controllers.

In block 504, the keys are monitored to determine if the keys were programmed to start the vehicle. The PATS controller 30 or the PEPS controller 82 is adapted to determine if the keys are valid for starting the vehicle. The PATS controller 30 or the PEPS controller 82 is also adapted to determine if the keys correspond to either the primary or the secondary driver. In the event the keys are not programmed or valid to start the vehicle, the diagram 500 moves to block 506. In the event the keys are properly programmed, the diagram 500 moves to block 508.

In block 506, the PATS controller 30 or the PEPS controller 82 determines an error and may not allow the driver to start the vehicle in the event the keys are not programmed to the vehicle.

In block 508, the cluster 22 determines if the key was programmed as a primary key for the primary user or if the key was programmed as a secondary key for the secondary user. If the key is determined to be a primary key for the primary driver, then the diagram 500 moves to the block 510. If the key is determined to be a secondary key for the secondary driver, then the diagram 500 moves to the block 512. If the key has not been tagged to or programmed to either driver, then the diagram 500 moves to block 510.

In block 510, the primary driver may enable/disable the LDW feature as desired. In one example, the primary driver may enable/disable the LDW operation via the message centers switches 26 in the cluster 22 or via the SDM 112. In the case the SDM 112 is used, the SDM 112 may transmit a control signal to the LDW module 70 to enable/disable the LDW feature. In yet another example, the primary driver may enable/disable the LDW feature via the LDW switch 74. The LDW module 70 may default "ON" for each new ignition cycle. As such, the primary driver may have to disable the LDW feature after each ignition cycle in the event such an action is desired.

In block 512, the cluster 22 inhibits the LDW disable for the secondary driver. In other words, the cluster 22 may not display a prompt to allow the secondary user to enable/disable the LDW feature. Alternatively, the SDM 112 may not display the prompt to allow the secondary user to enable/disable the LDW feature. The inhibit disable function is accomplished by masking the standard menu option in the cluster 22 or the SDM 112. In the event the LDW switch 74 is implemented, the LDW module 70 may ignore requests from the LDW switch 74 to disable the LDW feature when the driver is detected to be the secondary driver. As noted above, the cluster 22 or the SDM 112 may display a warning to the secondary driver to notify that secondary driver that the LDW feature cannot be disabled.

In block 514, a determination is made as to whether the secondary driver is attempting to adjust the sensitivity of the LDW feature. For example, the LDW module 70 may determine whether it is receiving an input from the LDW switch 74 or an input from the cluster 22 that indicates a sensitivity change in the operation of the LDW feature. If the LDW module 70 receives a request to change the sensitivity level, the method 500 moves to block 516. If the LDW module 70 does not receive a request to change the sensitivity level, the method 500 moves to block 512.

In block 516, the LDW module 70 determines whether it has received an input from either the LDW switch 74 or the cluster 22 to allow the secondary driver to adjust the sensitivity level of the LDW feature. For example, the primary driver may configure the LDW module 70 to allow the secondary driver to adjust the sensitivity level. Such an operation is performed when the primary driver is detected to be the driver of the vehicle and when the primary driver has enabled the LDW module 70 to adjust the sensitivity level for a secondary driver who is later detected to be the driver of the vehicle.

If the LDW module 70 has not been enabled by the primary driver to allow the secondary driver to adjust the sensitivity level of the LDW feature, then the method 500 moves to block 518. If the LDW module 70 has been enabled by the primary driver to allow the secondary driver to adjust the sensitivity level of the LDW feature, then the method 500 moves to block 520.

In block 518, the LDW module 70 prevents the secondary driver from adjusting the sensitivity level.

In block 520, the LDW module 70 adjusts the sensitivity level to that selected by the secondary driver.

In general, the embodiments described herein differentiate between primary and secondary drivers so that the secondary driver may have less control over a particular safety and notification related feature than the primary driver. The embodiments of the present invention allow primary drivers to prevent secondary drivers from disabling safety and/or notification related features on the vehicle.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for controlling a vehicle feature based on driver status, the system comprising:

a first key ignition device positioned on a primary key for transmitting a first driver status signal indicative of the driver being a primary driver;

a second key ignition device positioned on a secondary key for transmitting a second driver status signal indicative of the driver being a secondary driver; and at least one controller for being operably coupled to the first key ignition device and to the second key ignition device and being configured to:

receive the first driver status signal; and receive a command via a user interface from the primary driver to activate or deactivate the vehicle feature, the vehicle feature for being activated in response to subsequently receiving the second driver status signal indicating that the secondary driver is the driver.

2. The system of claim 1 wherein the at least one controller includes a passive entry passive start (PEPS) controller being configured to receive the first driver status signal from the primary key and the second driver status signal from the secondary key.

3. The system of claim 2 wherein the at least one controller further includes a seatbelt status controller and the vehicle feature comprises notifying the at least one of the primary driver and the secondary driver about the status of a safety restraint in a vehicle.

4. The system of claim 2 wherein the at least one controller further includes a forward collision warning (FCW) controller and the vehicle feature comprises generating at least one position notification signal indicative of the position of an object with respect to a vehicle.

5. The system of claim 2 wherein the at least one controller further includes an electronic stability control (ESC) controller and the vehicle feature comprises stabilizing the movement of a vehicle.

6. The system of claim 2 wherein the at least one controller further includes a lane departure warning (LDW) controller and the vehicle feature comprises monitoring a vehicle's position with respect to road lane markings in order to detect a lane departure.

7. The system of claim 1 wherein each of the first key ignition device and the second key ignition device includes a radio frequency (RF) based transponder for transmitting each of the first driver status signal and the second driver status signal as an RF based signal.

8. The system of claim 1 wherein the primary driver has greater control over the vehicle feature than that of the secondary driver.

9. The system of claim 1 wherein the at least one controller is further configured to receive the driver status signal via a communication bus.

10. The system of claim 1 wherein the at least one controller is further configured to wirelessly receive the driver status signal.

11. The system of claim 1 wherein the vehicle feature comprises a notification feature.

12. The system of claim 11 wherein the notification feature corresponds to a notification provided by at least one of a lane departure warning system, a seat belt status system, and a collision warning system.

13. The system of claim 1 wherein the vehicle feature comprises at least one of a vehicle stabilization feature and a park aid feature.

14. A device for controlling a vehicle feature for a primary driver and a secondary driver, the device comprising:
a controller being configured to:

receive a driver status signal indicative of the driver being one of the primary driver and the secondary driver;

determine that the driver of the vehicle is the primary driver based on the driver status signal; and receive a command to activate or deactivate the vehicle feature for the primary driver, the vehicle feature for being activated in response to subsequently receiving the driver status signal indicating that the secondary driver is the driver of the vehicle.

15. The device of claim 14 wherein the controller is further configured to receive the driver status signal via a communication bus.

16. The device of claim 14 wherein the controller is further configured to wirelessly receive the driver status signal.

17. The device of claim 14 wherein the vehicle feature comprises a notification feature.

18. The device of claim 17 wherein the notification feature corresponds to a notification provided by at least one of a lane departure warning system, a seat belt status system, and a collision warning system.

19. The device of claim 14 wherein the vehicle feature comprises at least one of a vehicle stabilization feature and a park aid feature.

20. The device of claim 14 wherein the primary driver has greater control over the vehicle feature than that of the secondary driver.

21. A vehicle apparatus comprising:
a controller configured to:

wirelessly receive a driver status signal indicative of a driver being a primary driver or a secondary driver;

determine that the driver is the primary driver based on the driver status signal;

deactivate a notification feature for the primary driver via a user interface; and activate the notification feature in response to subsequently receiving the driver status signal indicating that the secondary driver is the driver of a vehicle.

22. The vehicle apparatus of claim 21 wherein the notification feature corresponds to a notification provided by at least one of a lane departure warning system, a seat belt status system, and a collision warning system.

23. The vehicle apparatus of claim 21 wherein the controller is further configured to deactivate the notification feature in response to receiving a command from the primary driver via the user interface.

24. The vehicle apparatus of claim 21 wherein the controller is further configured to control at least one of a vehicle stabilization feature and a park aid feature.

25. The vehicle apparatus of claim 24 wherein the controller is further configured to deactivate the at least one of the vehicle stabilization feature and the park aid feature for the primary driver, the at least one of the vehicle stabilization feature and the park aid feature for being activated after receiving the driver status signal indicating that the secondary driver is the driver of the vehicle.

26. The vehicle apparatus of claim 21 wherein the primary driver has greater control over the notification feature than that of the secondary driver.

* * * * *